United States Patent

Kyomasu et al.

[11] Patent Number: 5,684,903
[45] Date of Patent: Nov. 4, 1997

[54] RECEPTACLE AND METHOD OF MANUFACTURING THE SAME

[75] Inventors: Mikio Kyomasu; Takeshi Ikeya, both of Hamamatsu; Toshimichi Yasuda, Okaya; Shin Ikegami, Okaya; Takashi Yamagishi, Okaya, all of Japan

[73] Assignees: Hamamatsu Photonics K.K.; Kyocera Corporation, both of Japan

[21] Appl. No.: 496,405

[22] Filed: Jun. 29, 1995

[30] Foreign Application Priority Data

Jun. 30, 1994 [JP] Japan .................... 6-149827
Jun. 30, 1994 [JP] Japan .................... 6-149835
Jun. 30, 1994 [JP] Japan .................... 6-149844

[51] Int. Cl.⁶ .................................................. G02B 6/36
[52] U.S. Cl. .................... 385/93; 385/92; 385/94; 385/88
[58] Field of Search ...................... 385/93, 84–94, 385/60

[56] References Cited

U.S. PATENT DOCUMENTS

| 5,307,435 | 4/1994 | Chihara | 385/92 |
| 5,333,224 | 7/1994 | Kikuchi | 385/93 |
| 5,375,183 | 12/1994 | Edwards et al. | 385/60 |
| 5,537,503 | 7/1996 | Tojo et al. | 385/93 |
| 5,546,490 | 8/1996 | Kikuchi et al. | 385/93 |

FOREIGN PATENT DOCUMENTS

| 0 544 149 | 6/1993 | European Pat. Off. | 385/93 |
| 25 16 858 | 10/1976 | Germany . | |
| 43 11 980 | 6/1994 | Germany . | |
| 58-211728 | 12/1983 | Japan | 385/93 |
| 3-157606 | 7/1991 | Japan | 385/88 |
| 3-217133 | 9/1991 | Japan . | |
| 4-177883 | 6/1992 | Japan . | |
| 5-150144 | 6/1993 | Japan | 385/92 |

OTHER PUBLICATIONS

Patent Abstract of Japan; Publication No. JP-A-05 333244, Publication Date: Dec. 17, 1993, vol. 018, No. 162 (P-1712).

Patent Abstracts of Japan; Publication No. JP-A-63 023107, Publication Date: Jan. 1, 1988, vol. 012, No. 231, (P-723).

Patent Abstracts of Japan: Publication No. JP-A-63 085510, Publication Date: Apr. 16, 1988, vol. 012, No. 319 (P-751).

*Primary Examiner*—Phan T. H. Palmer
*Attorney, Agent, or Firm*—Cushman Darby & Cushman Intellectual Property Group of Pillsbury Madison & Sutro, LLP

[57] ABSTRACT

This receptacle comprises a case made of resin, holding a rigid sleeve by being in contact with the outer wall of the rigid sleeve, having a through hole communicating with the through hole of the rigid sleeve at one end thereof.

10 Claims, 21 Drawing Sheets

Fig. IA
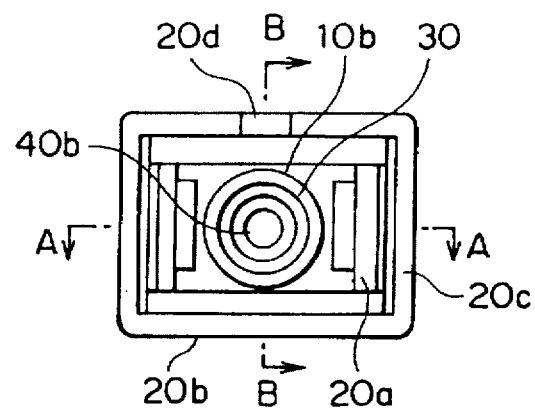
Fig. IB
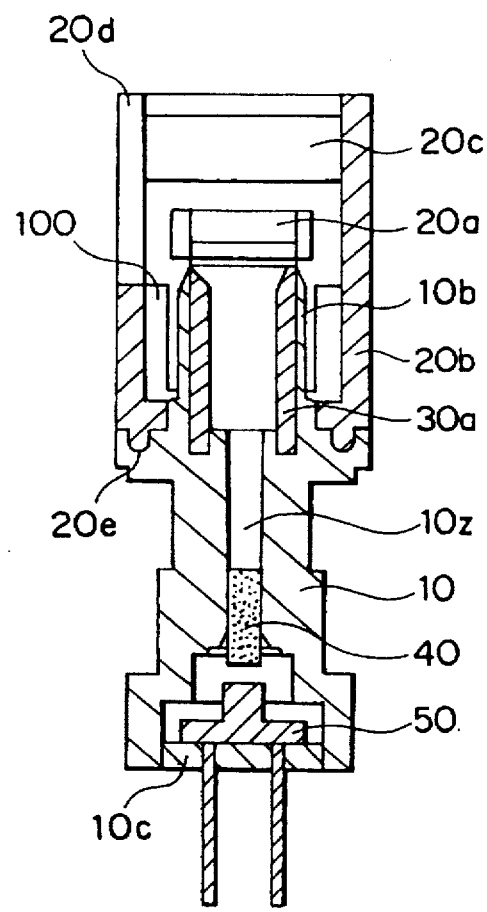

Fig. IC
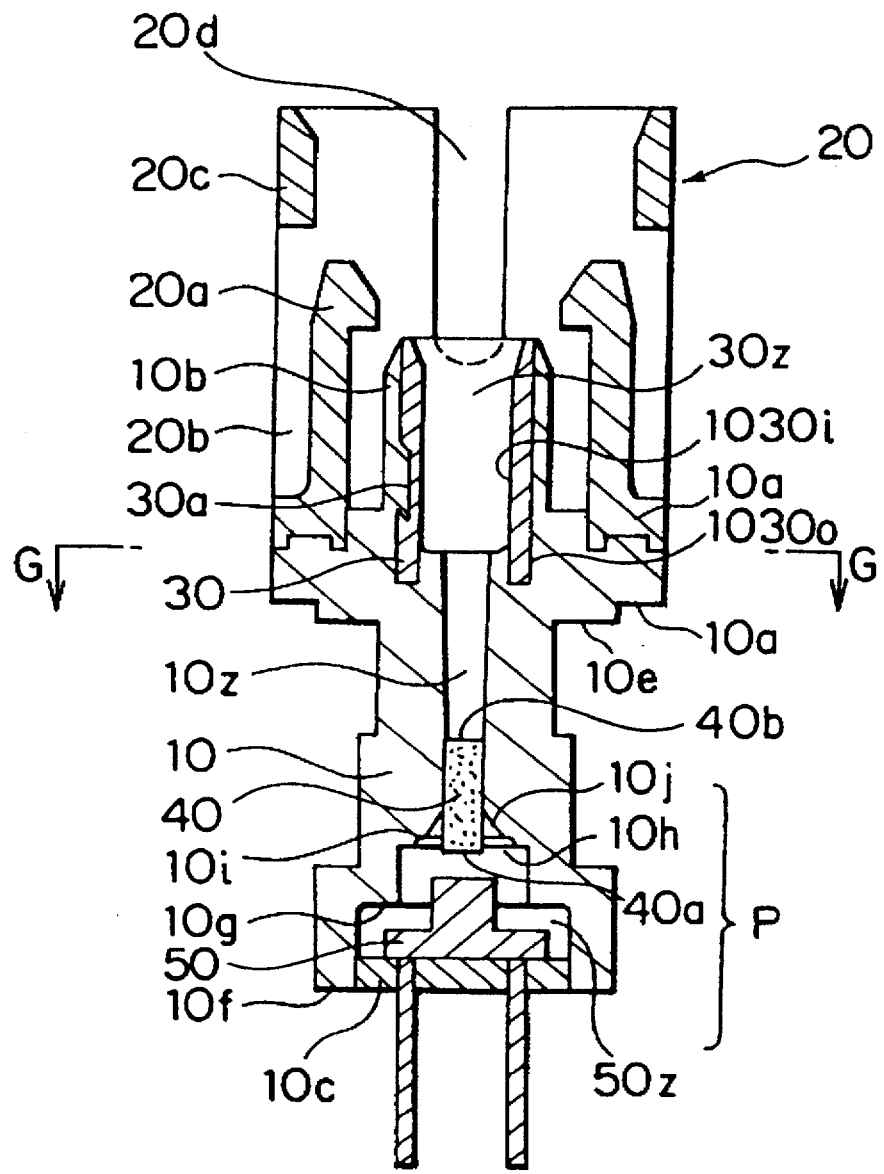

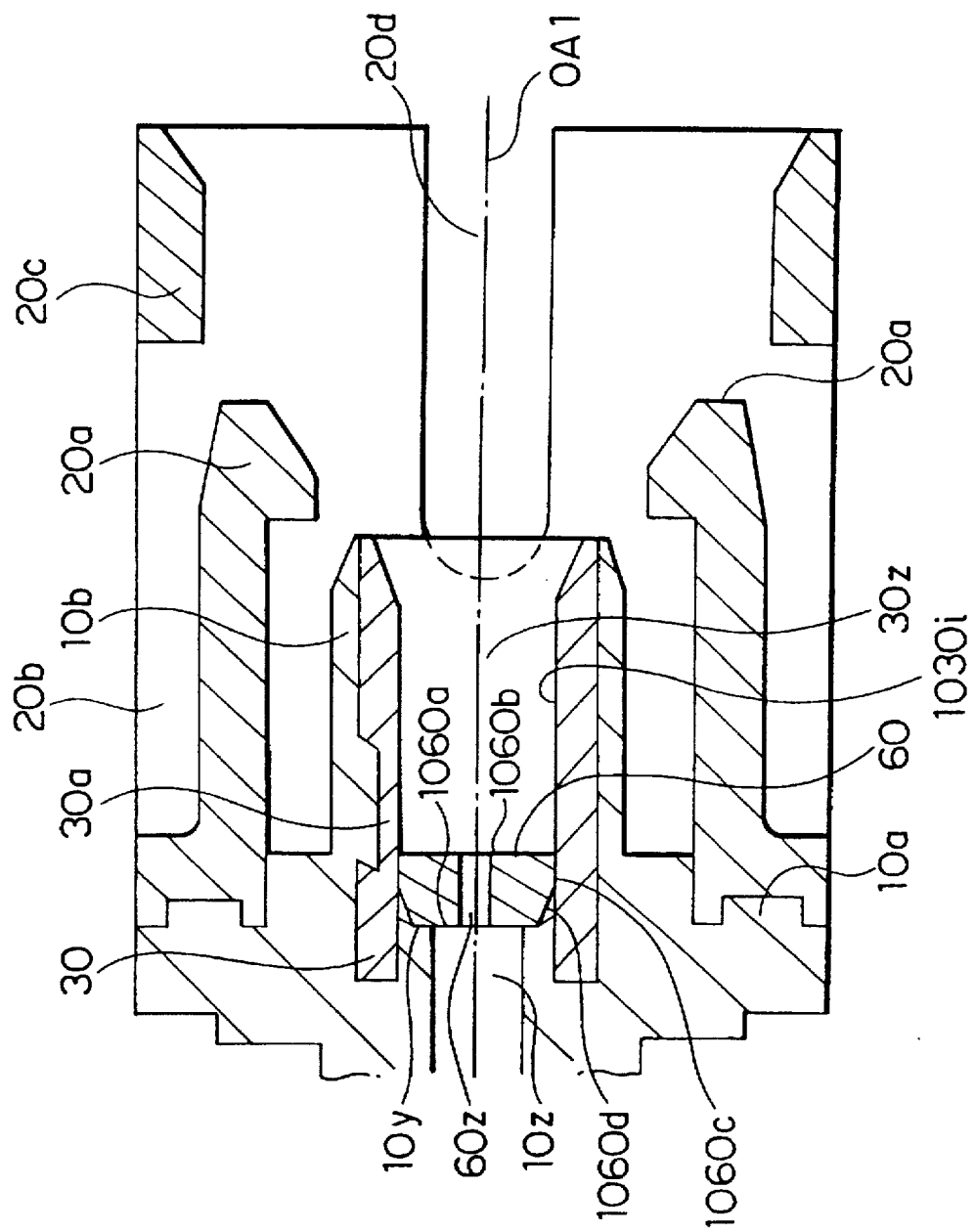

TOLERANCE CHARACTERISTICS OF SML IN Z-AXIS DIRECTION

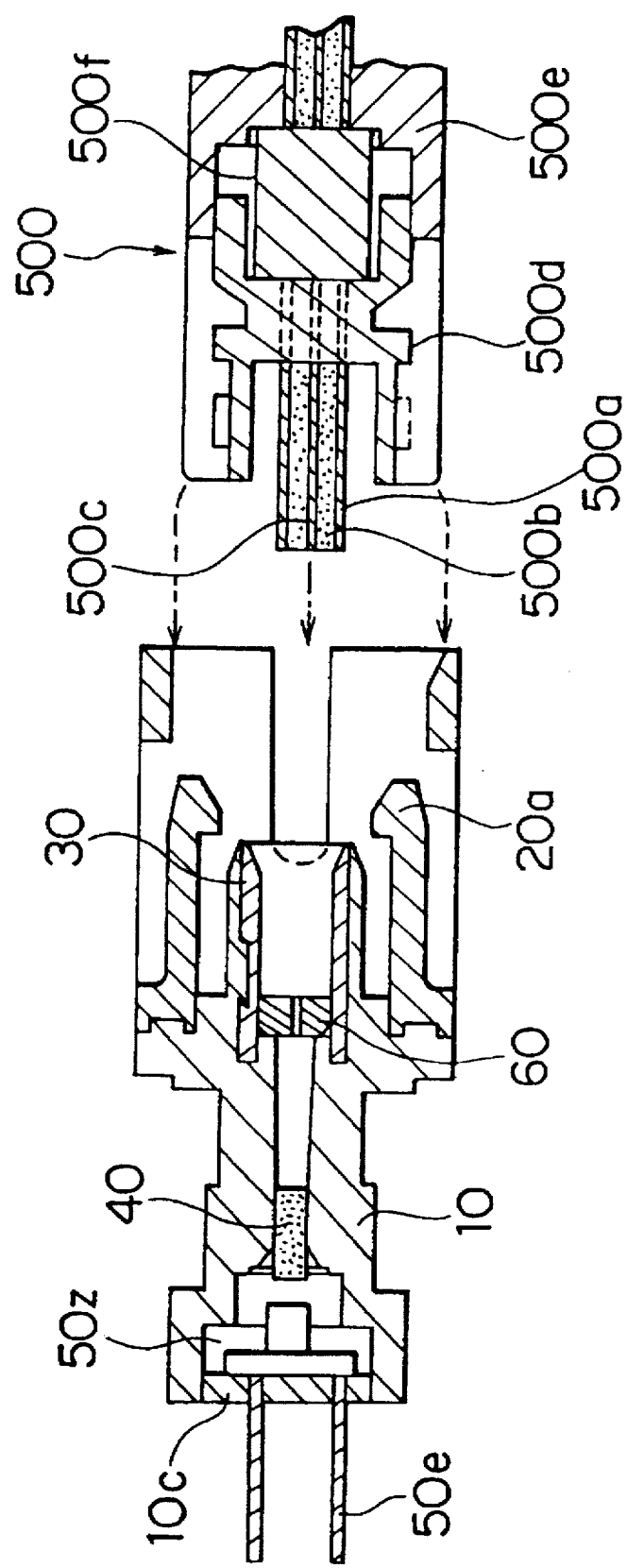

RECEPTACLE AND METHOD OF MANUFACTURING THE SAME

BACKGROUND OF THE INVENTION

1. Field of the Invention

The present invention relates to a receptacle used for optically coupling an optical semiconductor element and an optical fiber, and a method of manufacturing the same.

2. Related Background Art

A receptacle is widely used as an optical coupling device for coupling an optical semiconductor element and an optical fiber. Conventionally, receptacles are made of metals. A sleeve is mounted in such a metal receptacle by welding or press fit. When welding is employed, corrosion occurs due to oxidation, leading to poor durability. When press fit is employed, the sleeve is inclined depending on the applied force due to the fit tolerance, leading to a positional shift.

SUMMARY OF THE INVENTION

As a countermeasure for above problems, (1) Japanese Patent Laid-Open 5-150144 reports a receptacle comprising a sleeve, a sleeve holding body for holding the sleeve, and a synthetic resin body formed with an insertion hole communicating with a connector insertion hole, wherein the metal sleeve and the sleeve holding body made of a metal are covered with a resin.

Also, (2) Japanese Patent Laid-Open No. 58-211728 describes a receptacle in which a coupling connector and a spherical lens are integrally formed so that the receptacle can be manufactured at a low cost.

The receptacles (1) and (2) can be manufactured at a low cost. However, in the receptacle (1), since the sleeve is fitted in the sleeve holding body, the connecter insertion hole is undesirably deformed and its center axis is shifted due to the strain caused by a stress applied by the sleeve. A deformation occurs when inserting the sleeve into the case.

Consequently, the axes of the connector insertion hole and the case body cannot be aligned at high precision. Since deformation of the receptacle causes a large transmission loss, it cannot serve as a high-precision receptacle. Although such a deformation can be reformed by polishing the inner surface of the sleeve, if such a polishing step is added, the manufacturing time and the manufacturing cost are increased, resulting in a low productivity.

In the receptacle (2), since a sleeve is not incorporated in its structure, its axial precision is out of the question.

The present invention provides a receptacle made of a resin, in which the optical path of light emitted from an optical semiconductor element and the optical axis of the fiber can be set to coincide with each other and these optical path and axis coincide even when the receptacle is deformed by a temperature change, and a method of manufacturing the same.

The present invention is directed to a resin-molding receptacle used for optically connecting an optical semiconductor element to a cylindrical optical connector in which an optical fiber is installed.

In order to solve the problems described above, the resin-molding receptacle according to the present invention comprises: (A) a rigid sleeve having a through hole defined by the inner radius, wherein the ferrule fits into the inner hole by inserting the ferrule into it; (B) a case made of resin, holding the rigid sleeve by being in contact with the outer wall of the rigid sleeve, having a through hole communicating with the through hole of the rigid sleeve at one end thereof; and (C) a lens fixed to the inner wall of the through hole of the case, the optical axis of the lens being identical with the axis of the through hole of the case, the axis of the through hole of the rigid sleeve being identical with the axis of the through hole of the rigid sleeve, the light being coupled to the optical fiber through the lens, sleeve and ferrule.

Such a resin-molding receptacle can be manufactured by using the following method. This method comprises: a first step of preparing an under mold pattern which has a column portion and a truncated-cone portion continued to the column portion with same axis; a second step of fitting a sleeve to the column portion; and a third step of casting a resin to the under mold pattern so as to cover the outer walls of the sleeve and the truncated-cone portion with the resin.

The method is explained in more detail below.

The portion of the under mold pattern is obtained by integrally forming two cylindrical mold patterns having the same axis but different diameters (R1, R2) such that their axes coincide.

The cylindrical sleeve is made of a metal or ceramic material. In the second step, the inner wall of the cylindrical sleeve contacts with the outer wall of column portion of the under mold pattern. In the third step, The resin is cast to be in contact with the outer wall of the sleeve and the outer wall of the other mold pattern. After the casting, the resin is polymerized. Next, the composite mold patterns are extracted from the consolidated resin, and a lens is fixed in a lens holder by the resin molding.

According to the method of manufacturing the resin-molding receptacle of the present invention, in the first step, a cylindrical sleeve made of a metal or ceramic material is fitted in a composite mold pattern having a portion which is obtained by integrally forming two cylindrical mold patterns having the same axis but different diameters so as to cause their axes to coincide, such that the inner wall of the cylindrical sleeve is in contact with the outer wall of one mold pattern.

In the second step, a resin is cast to be in contact with the outer wall of the sleeve and the outer wall of the remaining portion of the mold pattern, and is polymerized.

In the third step, the composite mold pattern is extracted. In the fourth step, a lens is fixed in a lens holder by the resin molding.

In the resin-molding receptacle manufactured in this manner, the axis of the outer plane in the resin, the lens mounting portion, and the axis of the sleeve can be automatically aligned without axial deformation.

In the resin-molding receptacle according to the present invention, since the outer plane constituting the case and the sleeve are integrally formed in this manner, not only axial deformation does not occur, but also a supersonic compression step of the sleeve or the like is not included. Thus, a strain caused by compression can be avoided.

Furthermore, since the through hole of the molding case and the sleeve are integrally formed such that their axes coincide with each other, even if the resin is deformed due to a temperature change, it is deformed uniformly. Thus, even when the case size is changed, axial modification does not greatly occur.

Although this resin-molding receptacle has the above advantages, when the mold pattern is to be extracted in the manufacturing process, the sleeve cannot sometimes be separated from the mold pattern and thus cannot be separated from the resin constituting the case and be fixed. If the adhesion strength between the sleeve and the case is set to be larger than the coefficient of friction between the mold pattern and the sleeve, the mold pattern can be extracted while the sleeve is kept fixed to the case.

Regarding this adhesion strength, it is sufficient if the adhesion strength between the holding portion of the case and the outer wall of the sleeve is larger than the coefficient of friction between the inner wall of the sleeve and the mold pattern fitted in the inner wall. In the resin-molding receptacle of the present invention, in order to obtain this adhesion strength, an uneven structure, for example, a recessed portion or a projecting portion, is formed on the outer wall of the sleeve, or the outer wall of the sleeve is roughened.

The resin case surrounds and supports the outer wall of the sleeve. The combination of the materials used for the case and the sleeve was studied carefully, and the following facts were discovered. If the case is, for example, made of a liquid crystal polymer and the sleeve is made of a ceramic or a metal, the adhesion between the case and the sleeve is improved, thereby increasing the adhesion strength between them.

The case and the sleeve formed in this manner are not substantially distorted by a temperature change in a direction perpendicular to the through hole or the axis of the hole while maintaining a high hardness. The mold pattern and the sleeve can be machined at a high precision.

Since the adhesion strength of the sleeve with the mold pattern in the manufacturing process is comparatively low, the mold pattern can be easily extracted from the sleeve. Thus, a strain does not generate in both of the molding and the sleeve by extracting them from the mold pattern, so that axial deformation does not occur.

It is particularly preferable that the polymer molecules constituting the liquid crystal polymer are aligned in the longitudinal direction of the through hole. More specifically, if the liquid crystal polymer is used as the resin in molding the case and the resin is flowed in the longitudinal direction of the case to be molded, the polymer molecules of the liquid crystal polymer are aligned along the longitudinal direction of the through hole of the case.

Since the liquid crystal polymer has a small thermal expansion coefficient, a change in length of the through hole in the axial direction can be minimized, even when a temperature change occurs.

As a result, a distance between the top face of the sleeve stopper and the lens and a distance between the lens and light-emitting and light-receiving elements are not changed, thereby enabling stable data transmission. Since the liquid crystal polymer has a high heat proof characteristics, a thermo-curing adhesive can also be used to fix the lens.

The SC connecter has grooves in which the clips or hooks are caught. In order to prevent an optical connector from being accidentally removed from the case, the SC connector is held by the clips extending from the case.

Since the friction between the through hole of the case constituting this resin-molding receptacle and the mold pattern is also large, the diameter of the through hole of the case on the sleeve side may be made larger than the diameter of the through hole of the case on the lens side, so that the mold pattern is easily extracted from the case.

The receptacles (1) and (2) can be manufactured at a low cost. However, in the receptacle (1), since the sleeve is fitted in the sleeve holder, the cylindrical structure is undesirably deformed due to the strain caused by a stress applied by the sleeve. An axial deformation occurs before connection with a sleeve holder, and the axes of the sleeve and its holder cannot be aligned at a high precision.

Since a receptacle having an axial deformation causes a large transmission loss, it cannot serve as a high-precision receptacle. Although such a deformation can be removed by polishing the inner surface of the sleeve, if such a polishing step is added, the manufacturing time and the manufacturing cost are increased, resulting in a low productivity.

In the receptacle (2), since a sleeve is not incorporated in its structure, its axial precision is out of the question.

It was confirmed that the ferrule of the connector to be inserted in the sleeve undesirably moves in the axial direction (z-axis direction) of the sleeve. This axial variation in the z-axis direction causes an increase in transmission loss.

In the receptacle of the present invention, since a step of forming the through hole which connects the sleeve and the lens and a step of fixing the sleeve to the case is performed simultaneously, and the optical axis of light emitted from the optical semiconductor element, the optical axis of the lens, the axis of the sleeve and the optical axis of the fiber are identical to each other, the ferrule inserted in the sleeve will not undesirably move in the axial direction of the sleeve, the coupling efficiency of light does not decrease, even though a resin is employed as a case material.

The present inventors found out that this axial variation in the z-axis direction is caused by the roundness of the distal end portion of the ferrule. The receptacle according to the present invention is manufactured based on this finding, and comprises (A) a cylindrical sleeve made of a metal or ceramic material and having an inner wall to fit on an optical connector, (B) a case having a holding portion which is brought into contact with an outer wall of the sleeve, thereby holding the sleeve, a through hole communicating with a hole defined by the inner wall of the sleeve on its one end side and having an axis coinciding with that of the sleeve and a diameter on the sleeve side which is larger than the diameter thereof on the other end side, and a lens mounting portion at the other end side of the through hole, the lens mounting portion of the through hole and the holding portion being integrally formed of a resin material, (C) a lens, fixed on the inner wall of the through hole, for causing an optical path of light emitted from an optical semiconductor element provided at the other end side of the case to coincide with the axis of the through hole, and (D) a pinhole member having a hole of a diameter smaller than the diameter of the through hole on the sleeve side and mounted to an end of the through hole on a side opposite to the lens mounting portion, the axis of this hole coinciding with the optical axis.

Such a resin-molding receptacle can be manufactured by employing the first step of fitting, in a composite mold patterns having a portion which is obtained by integrally forming a substantially columnar first mold pattern and a frustoconical second mold pattern having a bottom surface of a diameter which is smaller than that of the first mold pattern, by aligning the axes of the two mold patterns so that the bottom surface of the first mold pattern and the upper surface of the second mold pattern are connected to each other, a cylindrical sleeve made of a metal or ceramic material, such that the inner wall of the cylindrical sleeve is in contact with the outer wall of the first mold pattern, the second step of casting a resin to be in contact with the outer wall of the sleeve and the outer wall of the second mold pattern and polymerizing the resin, the third step of extracting the composite mold patterns, the fourth step of fixing a lens in a through hole in the resin molding by the outer wall of the second mold pattern, and the fifth step of placing, in the sleeve, a pinhole member having a hole of a diameter smaller than that of the bottom surface of the second mold pattern, such that the axis of the hole of the pinhole member coincides with the axis of the through hole.

According to the method of manufacturing a resin-molding receptacle, in the first step, a cylindrical sleeve made of a metal or ceramic material is fitted in a composite mold patterns having a portion which is obtained by integrally forming a substantially cylindrical first mold pattern and a truncated-cone-shaped second mold pattern having a bottom surface of a diameter which is smaller than that of the first mold pattern, by aligning the axes of the two mold patterns so that the bottom surface of the first mold pattern and the upper surface of the second mold pattern are connected each other, such that the inner wall of the cylindrical sleeve is in contact with the outer wall of the first mold pattern.

In the second step, a resin is cast to be in contact with the outer wall of the sleeve and the outer wall of the second mold pattern, and polymerized.

In the third step, the lower, upper and side mold patterns are extracted form the molding.

In the fourth step, a lens is fixed in a through hole in the resin molded by the outer wall of the second mold pattern.

Finally, in the fifth step, a pinhole member having a hole of a diameter smaller than that of the bottom surface of the second mold pattern is placed in the sleeve, such that the axis of the hole of the pinhole member coincides with the axis of the through hole.

In the resin-molding receptacle manufactured in this manner, the axis of the through hole in the resin, the lens mounting portion, and the axis of the sleeve can be automatically aligned without any axial shift.

In the resin-molding receptacle according to the present invention, since the through hole constituting the case and the sleeve are integrally formed in this manner, not only axial shift does not occur, but also a press-fitting step of the sleeve or the like is not included. Thus, a strain caused by press fit can be avoided.

Furthermore, since the through hole constituting the case and the sleeve are integrally formed such that their axes coincide with each other, even if the resin is deformed due to a temperature change, it is deformed uniformly. Thus, even when the case size is changed, the positional relationship between the optical axis of the lens and the center of the through hole does not change.

The diameter of the through hole of the case on the sleeve side is made larger than the diameter of the through hole of the case on the lens side so that the mold pattern used for manufacturing this resin-molding receptacle can be easily extracted from the case. The distal end of the optical connector (ferrule) to be inserted in the sleeve with the pinhole member is rounded. Undesirable movement of the sleeve in the axial direction, which is caused by precision variations in the rounding operation, can be suppressed by decreasing the diameter of the pinhole. If an edge defined by the open end face of the pinhole member and the outer wall is removed to such a degree that it will not contact a curved portion defined by the inner wall of the sleeve and the open end face of the through hole on the sleeve side, since the open end face of the sleeve and the open end face of the through hole can be brought into tight contact with each other, the axes of the through hole and the sleeve can be set to coincide with each other at a high precision. Regarding the shape of the pinhole member, as shown in FIG. 3, it may be flat or may partially have a projecting portion. The pinhole member may be mounted by press fit, adhesion, or ultrasonic compression.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a plan view of a resin-molding receptacle according to the first embodiment of the present invention;

FIG. 1B is a cross sectional view of the receptacle shown in FIG. 1A along the line B—B;

FIG. 1C is a sectional view of the receptacle shown in FIG. 1A along the line A—A;

FIG. 9 is an enlarged sectional view of a portion of the resin-molding receptacle shown in FIG. 8C including a rigid sleeve 30, a through hole 10z, and a pinhole member 60;

FIGS. 12A to 12F are sectional views of a resin-molding receptacle and its intermediate product employed to explain the manufacturing process of the resin-molding receptacle shown in FIG. 8C.

DESCRIPTION OF THE PREFERRED EMBODIMENTS

Figure 1D:
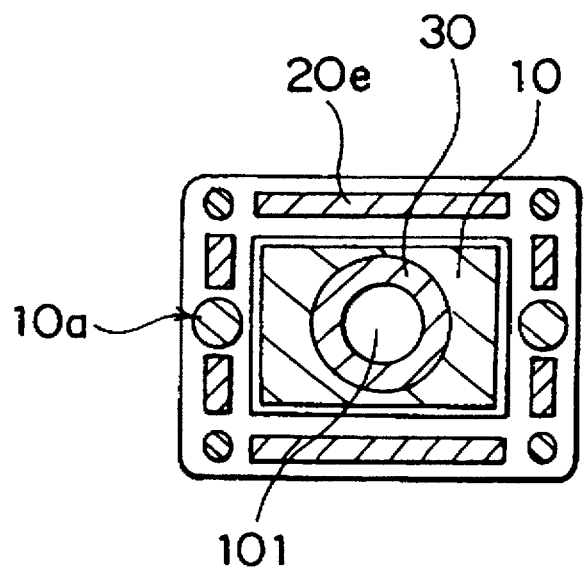
FIG. 1D is a sectional view of the receptacle shown in FIG. 1C taken along the line G—G.
Figure 1E:
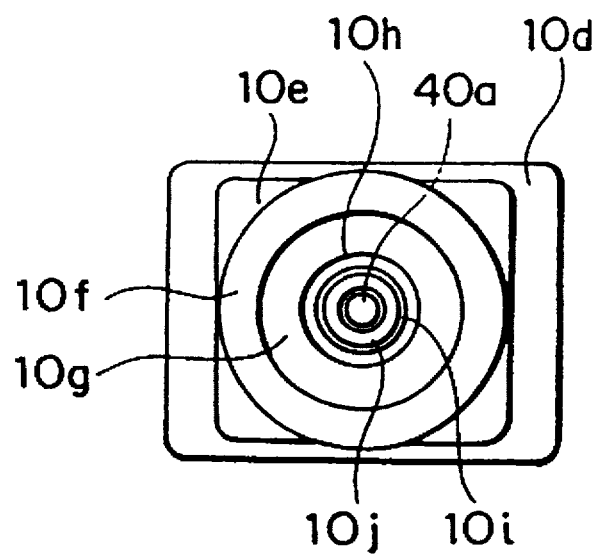
FIG. 1E is a bottom view of the receptacle shown in FIG. 1C seen from a direction of arrow 1 in FIG. 1, from which a base structure in laser diode is not shown.

The preferred embodiments of the present invention will be described with reference to the accompanying drawings. Note that the same reference numerals are used to denote the same elements, that a repetitive explanation is omitted, and that terms "upper" and "lower" indicate the upper and lower portions on the drawings, respectively.

FIGS. 1A to 1E show the structure of a resin-molding receptacle according to the first embodiment.

As is apparent from FIGS. 1B and 1C, this resin-molding receptacle has a rigid sleeve 30 and a GRAIN rod lens 40 in a case 10 which is formed by monolithic molding using a resin material. A laser diode, an optical semiconductor element, or a light-emitting element (light source) 50 is provided in the case 10. An SC connector holding section 20 constituted by portions 20a to 20e is fixed to the outer wall of the case 10.

The case 10, the SC connector holding section 20, the sleeve 30, the SELFOC lens 40, and the laser diode 50 will be described in detail. The case 10 has a through hole extending in the vertical direction. This through hole is constituted by a hole 30z, a through hole 10z, and a mounting hole 50z. The hole 30z is defined by the inner wall (surface) 1030i of the substantially cylindrical sleeve 30 whose outer wall (surface) 1030o is fixed inside the case 10.

The through hole 10z communicates with the hole 30z at one end of the case 10 and has a diameter smaller than that of the hole 30z. An optical semiconductor element (a laser diode or a light-emitting diode) is placed in the mounting hole 50z.

The mounting hole 50z communicates with the through hole 10z at the other end of the case 10 and has a diameter larger than that of the through hole 10z. The inner walls of these holes 10z, 30z, and 50z form a substantially cylindrical surface.

Figure 6A:
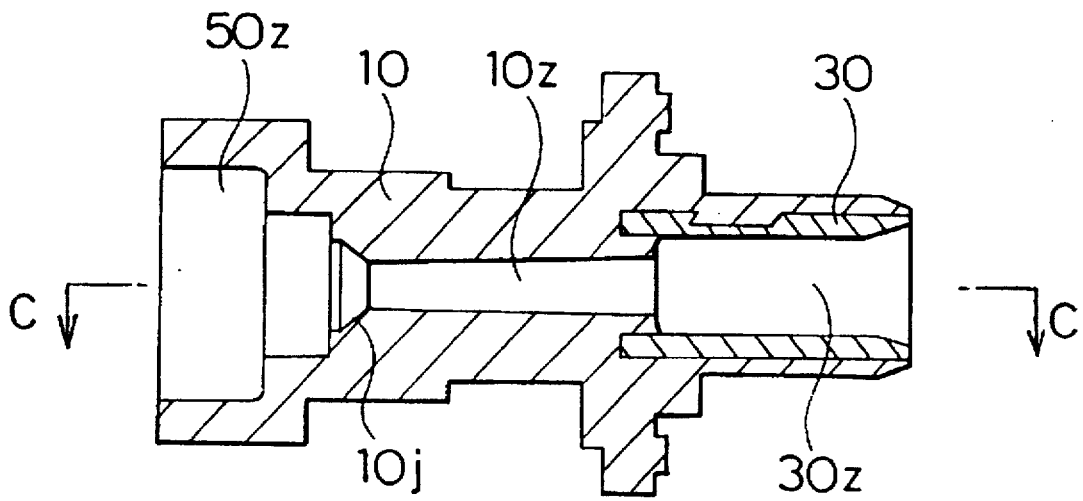
FIGS. 6A to 6E are sectional views of a resin-molding receptacle and its intermediate product employed to explain the manufacturing process of the resin-molding receptacle shown in FIG. 1C.
Figure 6B:
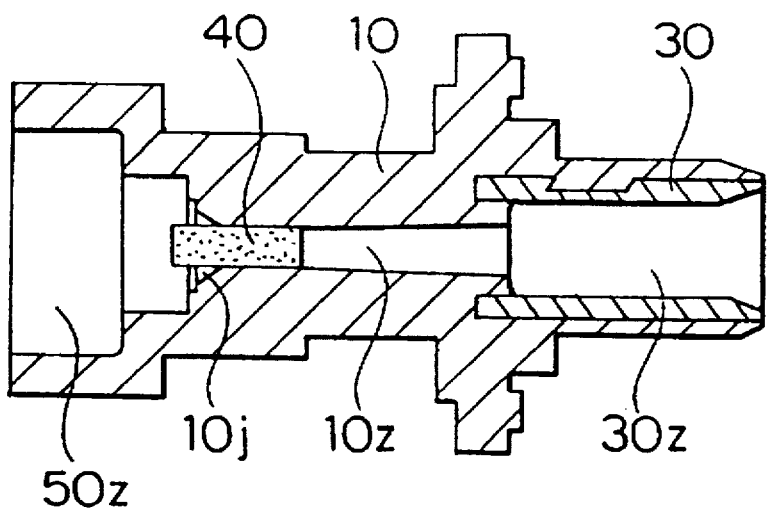
Figure 6C:
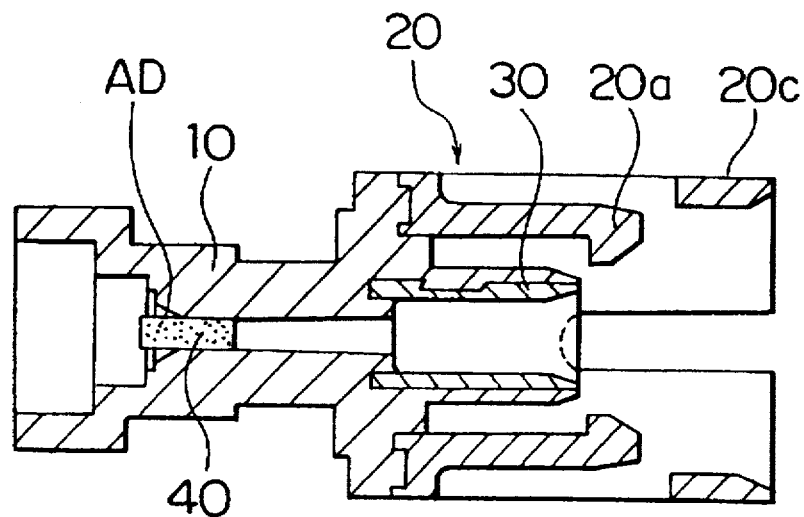

The sleeve 30 is cylindrical. A columnar ferrule forming part of the SC connector is fitted in the hole 30z, as shown in FIG. 6E. The outer wall of the sleeve 30 is surrounded by a holding portion 10b of the resin case 10. The holding portion 10b and the sleeve 30 are in tight contact with each other so that they do not move. A recessed portion (cavity) 30a is formed in the outer wall of the sleeve 30.

The holding portion 10b made of a resin is polymerized after being cured, so that it is fitted in the holding portion 10b. As a result, the movement of the sleeve 30 in the axial direction is particularly restricted. Especially, the recessed portion 30a is formed by milling to extend in the direction of the through hole 10z. Thus, the holding portion 10b fitted in this portion prevents the sleeve 30 from being removed from the case 10.

If the recessed portion 30a is a circular groove formed by boring to extend in the outer circumference of the sleeve 30, it can stabilize the flow of the resin during resin molding (to be described later).

The through hole 10z is a tapered hole whose diameter on the hole 30z side of the sleeve 30 is larger than that thereof on the mounting hole 50z side. The axis of the through hole 10z and that of the hole 30z coincide with each other. The substantially cylindrical SELFOC lens 40 is provided in the through hole 10z on the mounting hole 50z side such that its side wall is in contact with the through hole 10z. The SELFOC lens 40 is arranged such that the optical path of light irradiated from the optical semiconductor element 50 toward the sleeve 30 coincides with the axis of the through hole 10z.

Since the inner shapes of the through hole 10z and device holder 50z and the outer shape of the mounting hole 50z are circular, even when a stress is applied to the case 10, positional relationship between the optical axis of the lens 40 and the center of the through hole 10z is not changed, neither deformation or cracking of the case 10 does not occur.

The SC connector holding section 20 is made of a resin material. The SC connector holding section 20 has a pair of pawl portions (clips) 20a, a polyhedral holding portion 20c, a polyhedral case portion 20b, and slits 20d and 100 formed in the polyhedral case portion 20b. The pair of pawl portions 20a are parallel to the axial direction of the sleeve 30, are separated from the outer wall of the sleeve 30 by a predetermined gap, and oppose each other. A polyhedral SC connector support portion accommodating the ferrule of an SC connector (not shown) can be fitted in the polyhedral holding portion 20c. The outer wall of the polyhedral case portion 20b is parallel to the longitudinal direction of the pawl polyhedral 20a. The polyhedral case portion 20b is integrally formed with one end portion of each of the pawl portions 20a.

The hook portions 20a are fixed to the case 10, and the lower open end face of the polyhedral case portion 20b integrally formed is fixed to the case 10.

The hook portions 20a have hook portions at their distal ends. The cylindrical or opposite plate-like holding portions of the SC connector (not shown) can be fitted with the projecting portions of the pawl portions 20a. The projecting portions of the pawl portions 20a have introducing portions obtained by obliquely cutting the distal end portions of the pawl portions 20a in the longitudinal direction.

The positional relationship between the ferrule and the sleeve is determined by fitting the hook portions of the clips 20a into the grooves of the SC connector. More precisely, when the holding portion of the SC connector is inserted in the resin-molding receptacle, the pawl portions 20a are widened outwardly together with their projecting portions when a stress generated by insertion of the holding portion is applied to these cut introducing portions. After the holding portion is completely inserted, the pawl portions 20a are restored to the original positions, and are fitted with the holding portion. The proximal ends of the pawl portions 20a are fixed to a projecting portion 10a of the case 10 by ultrasonic compression or fitting, and the end of the case portion 20b is fixed in the recessed portion 20e in the case 10 by ultrasonic compression or fitting.

In this embodiment, the case 10 and the SC connector holding section 20 are made of a liquid crystal polymer.

However, the SC connector holding section 20 may be made of any other resin, e.g., PBT (polycarbonate).

Figure 2A:
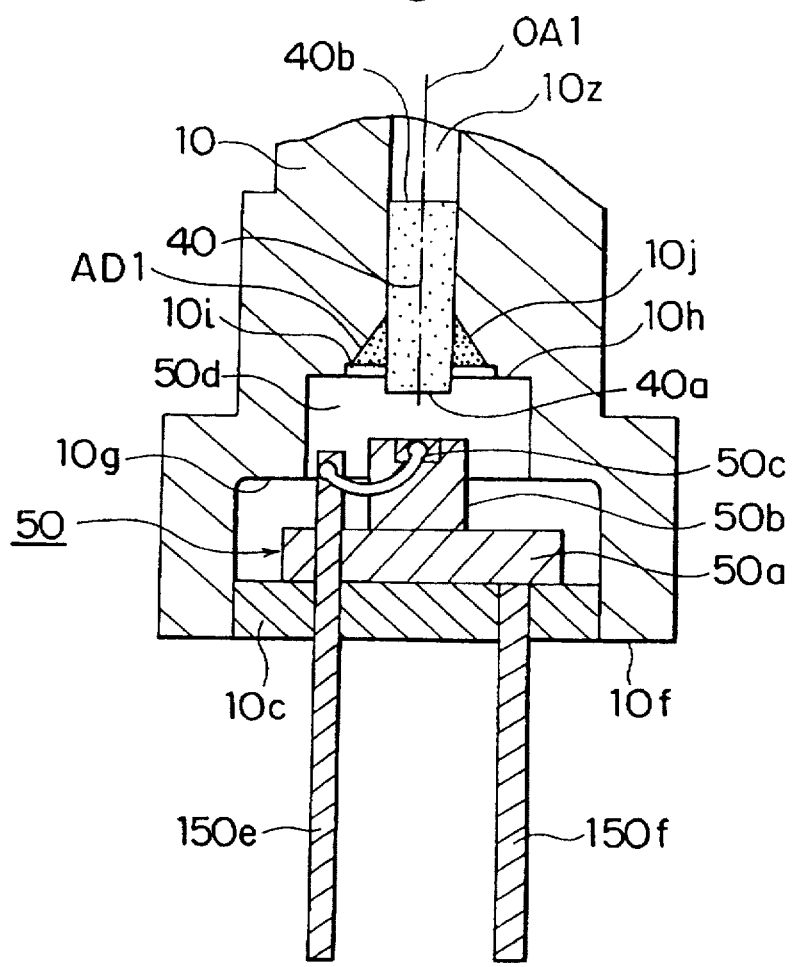
FIG. 2A is an enlarged sectional view of a portion P of the resin-molding receptacle shown in FIG. 1C.

The mounting structure of the optical semiconductor element 50 and the SELFOC lens 40 will be described. FIG. 2A is an enlarged sectional view of a portion P of the resin-molding receptacle shown in FIG. 1C.

A hole or space 10$i$ is formed in an open end face 10$h$ of the through hole 10$z$ of the case 10 on the optical semiconductor element 50 side. A substantially conical hole portion 10$j$ is formed such that its axis coincides with that of the hole portion 10$i$. These hole portions 10$i$ and 10$j$ communicate with the through hole 10$z$, and axes OA1 of the hole portion 10$i$, the hole portion 10$j$, and the through hole 10$z$ coincide with each other. The SELFOC lens 40 is fitted in the through hole 10$z$ such that their axes OA1 coincide with each other. An adhesive AD1 is coated on the inverted conical hole portion 10$j$ in order to fix the SELFOC lens 40. The adhesive AD1 is coated on the hole portion 10$j$ such that it will not overflow from the open end face 10$h$ toward the optical semiconductor element 50. The disc-like space 10$i$ prevents the adhesive AD1 from overflowing toward the optical semiconductor element 50 even when the adhesive AD1 is used in a large amount.

The light-emitting element 50 has a base 50$a$ whose axis coincides with that of the mounting hole 50$z$, and a portion 50$b$. An optical semiconductor element 50$c$, e.g., a semiconductor laser diode or an LED, is provided on the base 50$b$ such that the optical path of light emitted by the optical semiconductor element 50$c$ coincides with the axis OA1 (perpendicular to the surface of the base 50$a$) of the base 50$a$. Therefore, an axis OA1 of the optical semiconductor element 50$c$ coincides with the axis OA1 of the through hole 10$z$.

The base 50$a$ is mounted to be parallel to a reference surface 10$g$. The base 50$a$ is fixed to a lid portion 10$c$ made of an epoxy resin, thereby sealing the optical semiconductor element 50 in the case 10.

Figure 2B:
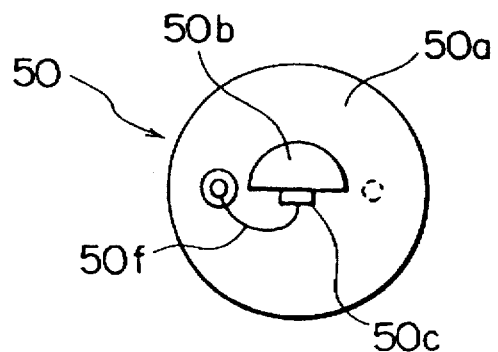
FIG. 2B is a plan view of the base structure in laser diode seen from a lens 40 side.

FIG. 2B is a plan view of the optical semiconductor element 50 seen from the SELFOC lens 40 side. The optical semiconductor element 50$c$ is connected to lead pins 150$e$ and 150$f$ through bonding wires 50$f$. The direction of thickness of the optical semiconductor element 50$c$ is perpendicular to the surface of the drawing sheet.

The adhesive strength between the sleeve 30 and the case 10 is larger than the coefficient of friction between the sleeve 30 and the mold pattern for molding a resin-molding receptacle. Thus, the mold pattern can be extracted while the sleeve 30 is kept to be fixed to the case 10. Regarding this relationship between the adhesive strength and the coefficient of friction, it is sufficient if the adhesive strength between the holding portion 10$b$ of the case 10 and the outer wall of the sleeve 30 is larger than the coefficient of friction between the inner wall of the sleeve 30 and a ferrule 500$a$ inserted in the sleeve. In order to achieve this relationship between the adhesive strength and the coefficient of friction, the recessed portion 30 may be formed in the outer wall of the sleeve 30, as in this embodiment, a projecting portion may be formed on the outer wall of the sleeve 30, or the outer wall of the sleeve 30 may be roughened.

A method of manufacturing the resin-molding receptacle shown in FIGS. 1A to 1E will be described.

The case 10 is fabricated by molding a resin with a mold pattern. This mold pattern will be described.

Figure 3:
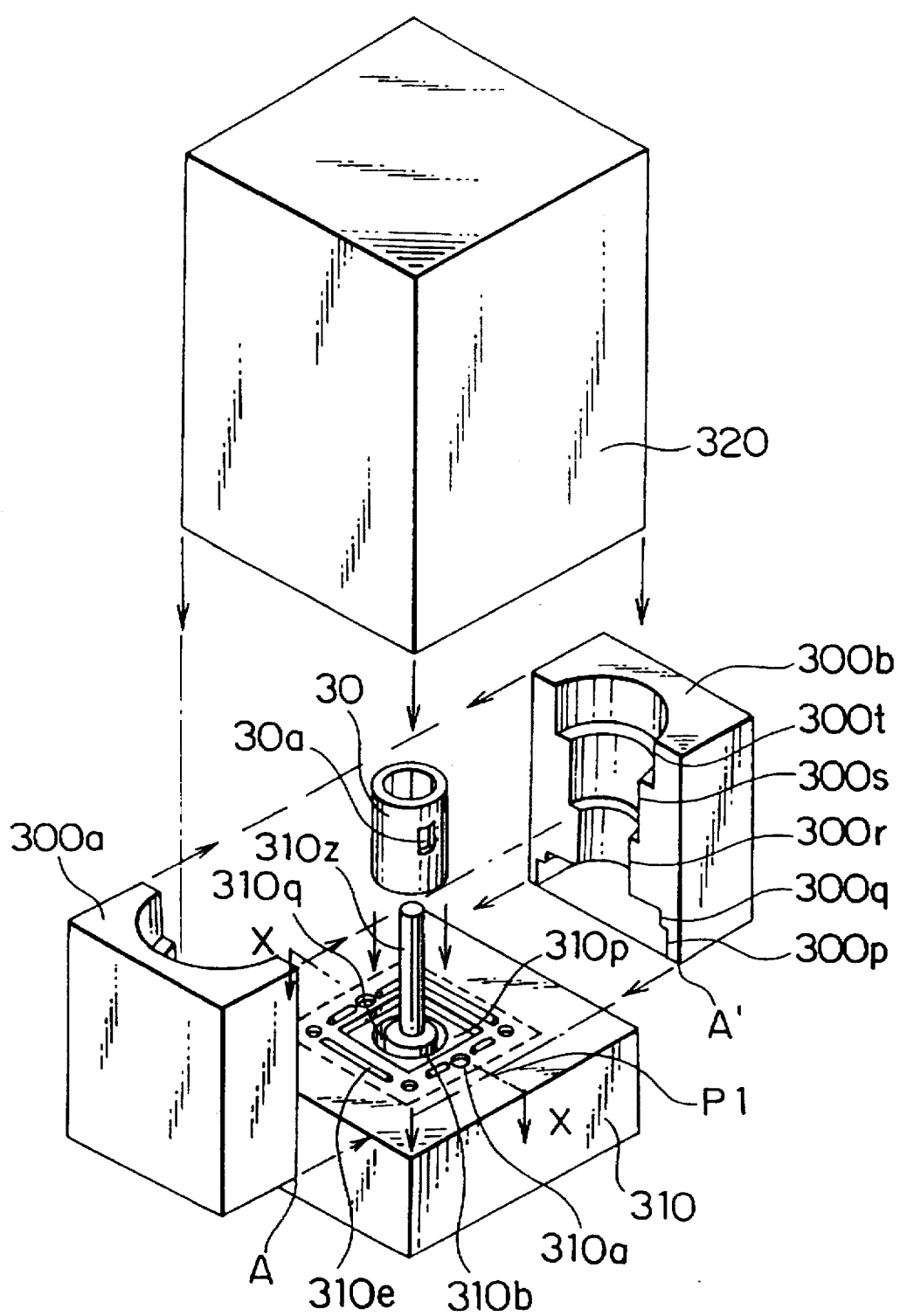
FIG. 3 is a developed perspective view of a mold pattern which is used for molding resin-molding receptacles according to the first and second embodiments.

FIG. 3 is a developed perspective view of the mold pattern which is used in this manufacture. This mold pattern has an upper mold pattern 320, a lower mold pattern 310, and side mold patterns 300$a$ and 300$b$.

The lower mold pattern 310 is of a substantially rectangular parallelepiped shape and has a plurality of recesses and projections on its upper surface. A square hole 310$p$ having the shape of a square plate is formed at the center of the upper surface of the lower mold pattern 310. A cylindrical hole (sunken portion) 310$q$ is formed in the square hole 310$p$ by boring to have the central point of the square hole 310$p$ as its axis. A first columnar portion (column portion) 310$b$ is formed by boring the bottom of the hole 310$p$. A second columnar portion (circular truncated-cone-shaped portion) 310$z$ which is substantially columnar and has a diameter smaller than that of the first columnar portion 310$b$ is integrally formed on the first columnar portion 310$b$ to have the axis of the first columnar portion 310$b$ as the common axis. The second columnar portion 310$z$ has a frustoconical structure in which the diameter of its distal end is smaller than that of its connecting portion with the first columnar portion 310$b$ at is lower end. A plurality of recessed portions 310$a$ and projecting portions 310$e$ are formed on the surface of the lower mold pattern 310 to surround the square hole 310$p$.

The side mold patterns 300$a$ and 300$b$ have a mirror-image relationship. The side mold pattern 300$a$ is combined with the side mold pattern 300$b$ such that their lower surfaces are in contact with the upper surface of the lower mold pattern 310. When the side mold patterns 300$a$ and 300$b$ are combined together, a through hole is formed in the vertical direction, such that its central axis coincides with the central axes of the first and second columnar portions 310$b$ and 310$z$. More specifically, the side mold patterns 300$a$ and 300$b$ are combined together by placing their points A and A' on a point P1 in FIG. 3 such that they are brought into contact with each other through a vertical plane extending through the point P1 and the central axis of the second columnar portion 310$z$.

When the side mold patterns 300$a$ and 300$b$ are combined together, a plurality of holes are formed to extend sequentially from their contact surfaces with the lower mold pattern 310, such that the holes have the common axis and communicate with each other, thereby forming a through hole. These plurality of holes are a square hole 300$p$, a square hole 300$q$, a cylindrical hole 300$r$, a cylindrical hole 300$s$, and a cylindrical hole 300$t$ in the order from the contact surfaces with the lower mold pattern 310. The square hole 300$p$ is formed by boring into the shape of a square plate to surround the plurality of recessed portions 310$a$ and projecting portions 310$e$ that surround the square hole 310$p$. The square hole 300$q$ is formed by boring into the shape of a square plate having one side shorter than that of the square plate 300$p$. The cylindrical hole 300$r$ is formed by boring into the shape of a cylinder to have a diameter shorter than one side of the square hole 300$q$. The cylindrical hole 300$s$ is formed by boring into the shape of a cylinder to have a diameter larger than that of the cylindrical hole 300$r$. The cylindrical hole 300$t$ is formed by boring into the shape of a cylinder to have a diameter larger than that of the cylindrical hole 300$s$. The square hole 300$p$, the square hole 300$q$, the cylindrical hole 300$r$, the cylindrical hole 300$s$, and the cylindrical hole 300$t$ communicate with each other to have the common axis, thereby forming a through hole.

To form the case of a resin-molding receptacle by using these mold patterns, first, the cylindrical sleeve 30 is fitted on the first cylindrical portion 310$b$. The length of the sleeve 30 in the axial direction is set larger than the distance between the upper surface of the lower mold pattern 310 and the bottom of the cylindrical hole 310$q$, and the lower open end face of the sleeve 30 reaches the bottom of the cylindrical hole 310q. The sunken portion 310q is defined by the cylindrical surface 1310p, and the column portion 310b is surrounded by the cylindrical surface 1310p.

After the sleeve 30 is fitted, the side mold patterns 300a and 300b are combined together, and a resin 10 is cast into the mold patterns formed by the inner walls of the side mold patterns 300a and 300b. Thereafter, the upper mold pattern 320 is placed on the combined side mold patterns 300a and 300b from above, thereby molding the resin 10. The resin 10 is a liquid crystal polymer.

Figure 4:
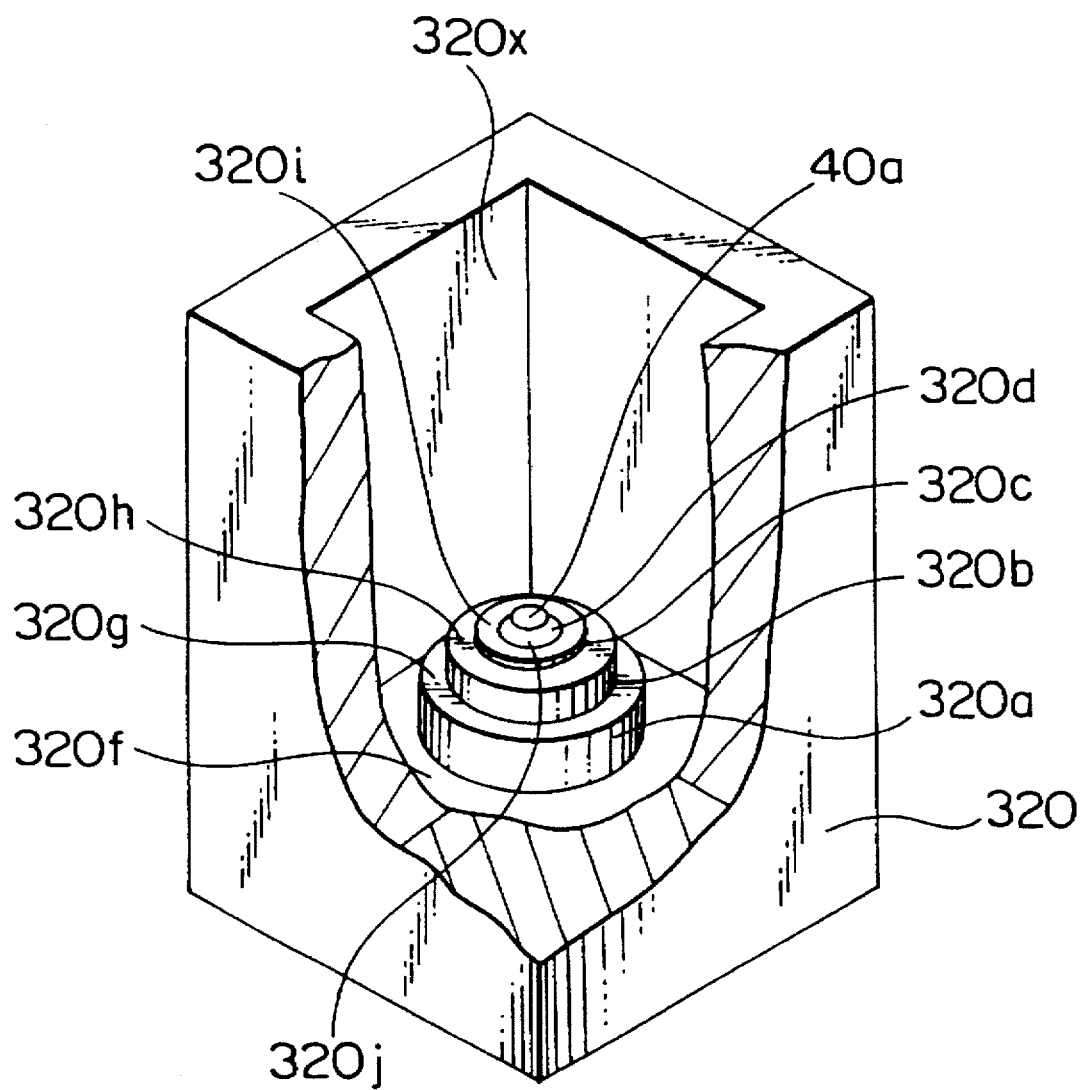
FIG. 4 is a partially cutaway perspective view of an upper mold pattern shown in FIG. 3.

FIG. 4 is a partially cutaway perspective view of the upper mold pattern 320 shown in FIG. 3. In FIG. 4, the upper mold pattern 320 shown in FIG. 3 is inverted. The upper mold pattern 320 has a substantially rectangular outer shape, and a polyhedral hole (cavity) 320x substantially having the shape of a polyhedron is formed in the surface of the upper mold pattern 320 by boring. A plurality of columnar portions 320a, 320b, and 320c, and a frustoconical base portion 320d, that have the common axis, are sequentially formed on the bottom surface of the polyhedral cavity 320x by stacking to be integral. Regarding the diameters of the columnar portions 320a, 320b, and 320c, and the frustoconical base portion 320d, the farther from the bottom surface of the polyhedral cavity 320x, the smaller. The axis extending through the central point of the polyhedral cavity 320x coincides with the common axis of the columnar portions 320a, 320b, 320c, and the frustoconical base portion 320d. Reference symbols 320f to 320j and 40a in FIG. 4 respectively denote the bottom surface of the polyhedral cavity 320x, the upper surfaces of the columnar portions 320a, 320b, and 320c, the side surface of the frustoconical base portion 320d, and the upper surface of the frustoconical base portion 320d.

Figure 5:
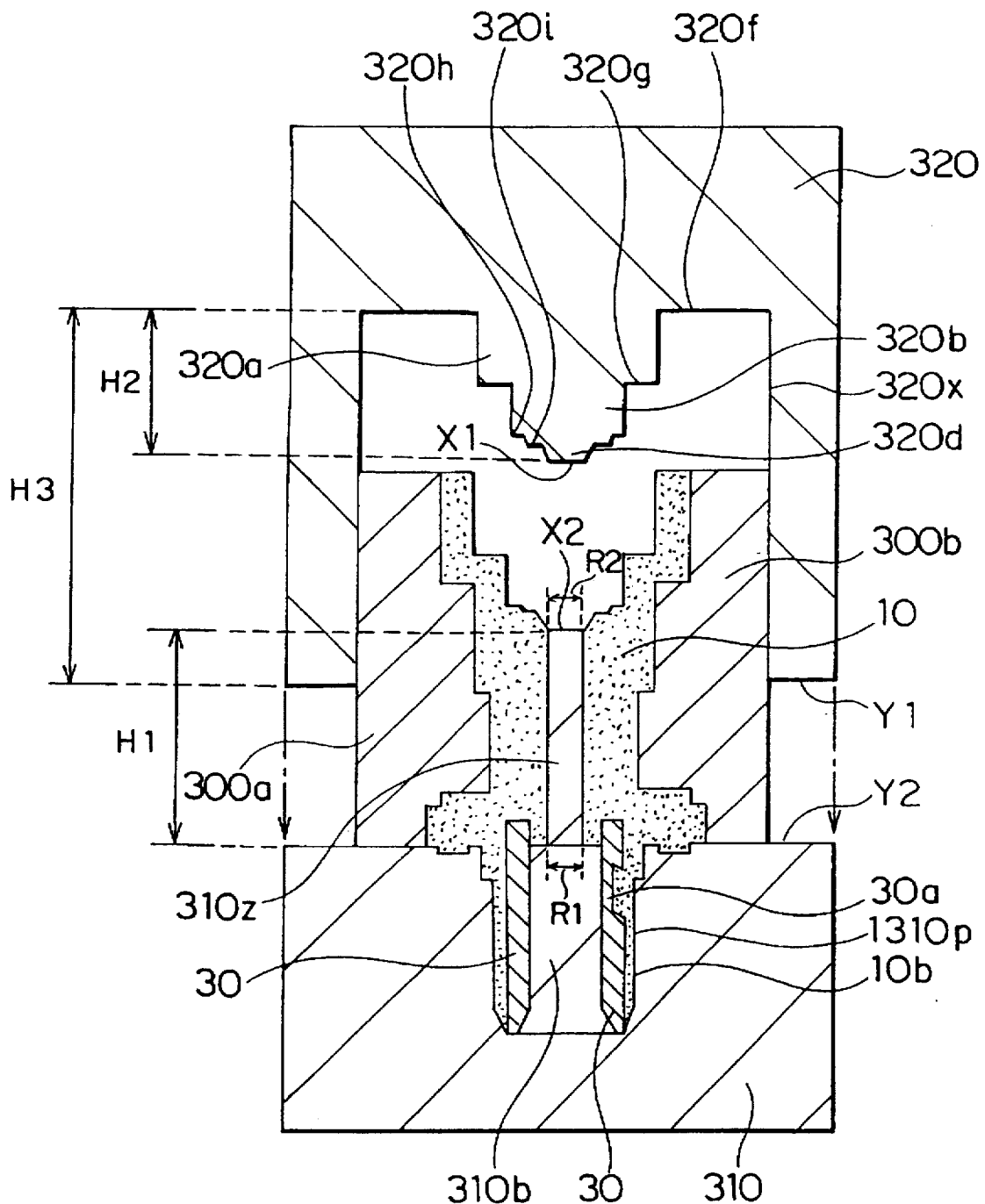
FIG. 5 is a sectional view of a resin and the mold pattern shown in FIG. 3 taken along the line X—X where the mold patterns are jointed together to mold the resin.

FIG. 5 is a longitudinally sectional view of a mold pattern set obtained by combining the mold patterns shown in FIG. 3 together, taken along the line extending through the point P1 and the central axis of the second columnar portion 310z shown in FIG. 3. After the side mold patterns 300a and 300b are combined together, the upper mold pattern 320 is placed on them from above, thereby molding the resin 10.

More specifically, the polyhedral cavity 320x of the upper mold has a square end and rectangular sides. The inner side walls of the polyhedral cavity 320x of the upper mold slides over the outer wall of the side molds 300a and 300b, and the lowest end face of the upper mold contacts with the upper surface of the lower mold. That is, the open end face (surface Y1) of the polyhedral cavity 320x of the upper mold pattern 320 is brought into contact with the upper surface (surface Y2) of the lower mold pattern 310, thereby the upper mold, the side molds and the lower mold are combined.

When the surfaces Y1 and Y2 are brought into contact with each other in this manner, the first and second columnar portions 310b and 310z having the axis perpendicular to the surface (surface Y2) of the lower mold pattern 310 become parallel to the upper surface 40a (surface X1) of the frustoconical base portion 320d of the upper mold pattern 320 or the surface 320g of the columnar portion 320a. Thus, the surface X1 coincides with the common axis of the through hole in the resin (case) 10 and the sleeve 30 fitted in the first columnar portion 310b.

As the axis of the columnar portion 320a coincides with this common axis, they coincides with the axis of the mounting hole 50z formed in the resin (case) 10 with the columnar portion 320a. Thus, if the columnar light-emitting element 50 having a width substantially equal to the diameter of the mounting hole 50z is fitted in the mounting hole 50z, as light is irradiated from the light-emitting element 50 in a direction perpendicular to the axis of the columnar portion 320a, the optical axis of the light-emitting element 50 coincides with the axes of the through hole 10z of the resin 10 and the sleeve 30.

Even if the light-emitting element 50 is not fitted in the mounting hole 50z, when the SELFOC lens 40 that can be fitted in the through hole 10z of the resin 10 is placed in the through hole 10z, the optical path of light emitted by the light-emitting element 50 and passing through the SELFOC lens 40, the axis of the through hole 10z, and the axis of the hole 30z defined by the inner wall of the sleeve 30 can be set to coincide with each other due to the presence of the reference surface (the surface 320g of the columnar portion 320a; the third plane). Also, fine adjustment of the optical axis can be performed without requiring adjustment of the θ component (solid angle component) of the optical axis. After the resin is cast in the mold pattern in this manner, the resin is polymerized, thereby molding the case 10.

The sum (H1+H2) of a distance H1 from the surface (surface Y2) of the lower mold pattern 310 to the upper surface (surface X2) of the second columnar portion 310z and a distance H2 from the bottom surface 320f of the polyhedral hole 320x to the upper surface (surface X1) of the frustoconical base portion 320d is equal to a distance H3 from the bottom surface 320f of the polyhedral hole 320x to the open end face (surface Y1) of the polyhedral hole 320x.

The surfaces 320f, 320g, 320h, 320i, and 320j respectively form shoulder portions 10f, 10g, 10h, 10i, and 10j of the case 10 of the resin-molding receptacle shown in FIG. 2A, and the second columnar portion 310z and the columnar portions 320a to 320d respectively form the through hole 10z and the mounting hole 50z shown in FIG. 2A.

The second columnar portion 310z of this mold pattern has a frustoconical structure in which the diameter of its distal end is smaller than that of its connecting portion with the first columnar portion 310b.

Therefore, the diameter of the through hole (10z in FIG. 1) molded by the second columnar portion 310z on the sleeve 30 side is larger than the diameter thereof on the side of the lens 40 to be placed, so that the resin (case) 10 tends to be easily extracted from the lower mold pattern 310. That is, as shown in FIG. 5, the diameter R1 of the portion 310z is smaller than the diameter R2 of the portion 310z, and the molding 10 is easily extracted from the portion 310z.

The steps of placing the SC connector holding section 20, the SELFOC lens 40, and the optical semiconductor element 50 in the case 10 (shown in FIG. 1C) formed in this manner and manufacturing the resin-molding receptacle shown in FIG. 1 will be described with reference to FIGS. 6A to 6E and FIG. 7.

FIGS. 6A to 6E and FIG. 7 are sectional views for explaining the manufacturing process of the resin-molding receptacle shown in FIG. 1C. A resin-molding receptacle whose sleeve 30 is held by the case 10 with its outer circumferential surface (outer wall) is manufactured (see FIG. 6A) by employing the steps described with reference to FIGS. 3 to 5. Then, the frustoconical SELFOC lens 40 is placed in the through hole 10z of the case 10. After the SELFOC lens 40 is fitted in the through hole 10z, an adhesive is coated on the inverted conical portion 10j molded by the frustoconical surface 320j of the mold pattern 320, thereby adhering/fixing the SELFOC lens 40 (see FIG. 6B).

Figure 7:
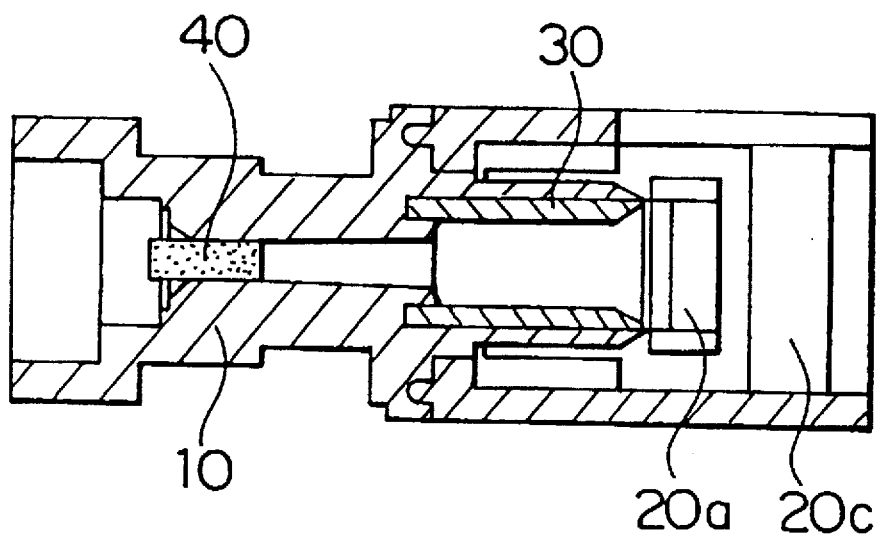
FIG. 7 is a sectional view of the intermediate product shown in FIG. 6A along the line C—C.

Subsequently, the SC connector holding section 20 made of a resin material is mounted to the case 10 by molding or supersonic compression (see FIG. 6C). The proximal end of the section 20 is fitted with the recessed portion 20e and the projection 10a shown in FIG. 1C, the section 20 is not shifted in the a direction perpendicular to the axial direction of the sleeve 30. FIG. 7 is a sectional view taken along the line C—C of FIG. 6A.

Figure 6D:
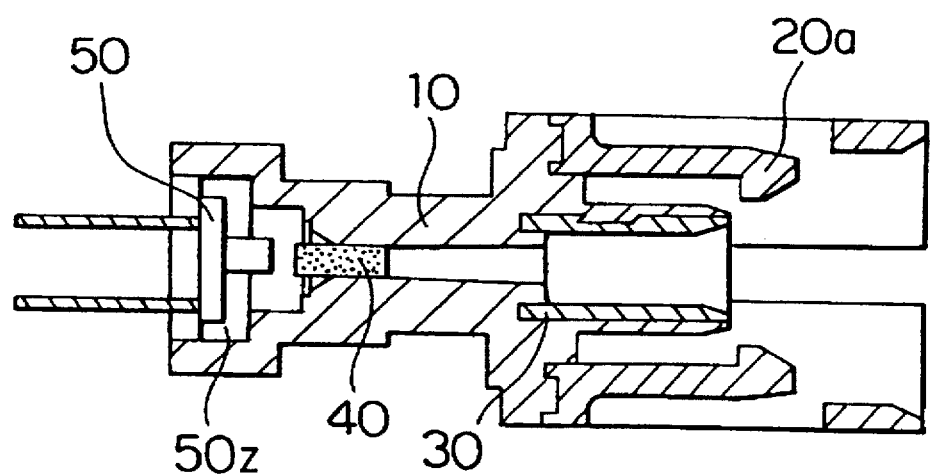
Figure 6E:
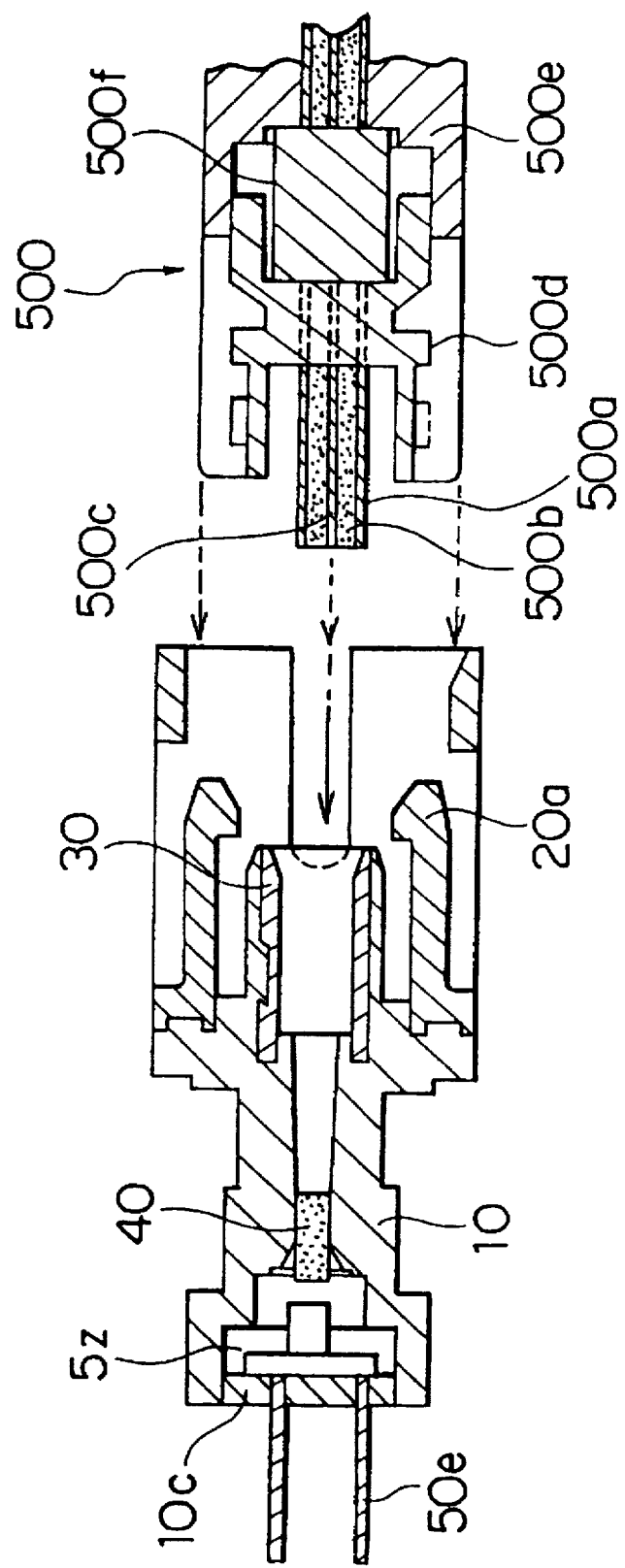

The optical semiconductor element 50 is fixed in the mounting hole 50z (see FIG. 6D). For this fixing, an ultraviolet (UV)-curing agent is coated between the optical semiconductor element 50 and the mounting hole 50z, and ultraviolet rays are irradiated an the agent, thereby fixing the optical semiconductor element 50 in the mounting hole 50z.

Thereafter, part of each lead pin 50e of the optical semiconductor element 50 is exposed to the outside of the case 10, as shown in FIG. 6E, and the lid portion 10c is fixed to the case 10 with an epoxy resin, thereby obtaining the resin-molding receptacle shown in FIG. 1C.

This resin-molding receptacle is connected to a (SC) connector 500. The SC connector 500 is constituted by an SC connector support portion 500d, a ferrule holding portion 500e, a ferrule 500a, a spring 500f, and a fiber (consisting of a cladding layer 500b and a core 500c). The ferrule 500a is fixed by the ferrule holding portion 500e. The spring 500f is interposed between the ferrule holding portion 500e and the SC connector support portion 500d and biases the SC connector support portion 500d. The fiber is enclosed by the ferrule 500a. The outer wall of the SC connector support portion 500d is in contact with the inner wall of the ferrule holding portion 500e. The ferrule holding portion 500e is slidably moved by the coiled spring 500f surrounding the ferrule 500a.

The distal end portion of the SC connector support portion 500d is fitted between the pawl portions 20a as the SC connector 500 is inserted in the resin-molding receptacle, and the ferrule 500a is fitted in the sleeve 30 such that its outer wall is in contact with the inner wall of the sleeve 30. Since the projecting portions 20a are further provided to the case 10, the ferrule 500a will not be undesirably removed from the case 10.

As described above, with the manufacturing method of a resin-molding receptacle according to the first embodiment, the axis of the through hole in the resin and the axis of the sleeve can be automatically aligned without any axial shift.

In this resin-molding receptacle, since the through hole 10z constituting the case 10 and the sleeve 30 are integrally formed in this manner, not only an axial deformation does not occur, but also a ultrasonic compression step of the sleeve or the like is not included.

Thus, a deformation caused by compression can be avoided. Since the adhesion strength between the sleeve 30 and the case 10 is set to be larger than the coefficient of friction between the mold pattern and the sleeve 30 in the presence of the recessed portion 30a, the mold pattern can be extracted while the sleeve 30 is kept to be fixed to the case 10.

Since the projecting portions 20a are further provided to the case 10, the ferrule 500a will not be undesirably removed from the case 10. The outer wall of the sleeve 30 is constituted by the resin case 10. The combination of the materials of the case 10 and the sleeve 30, which is integrally formed with the through hole 10z of the case 10, was studied carefully. Then, the following facts were found. If the case 10 is made of a liquid crystal polymer and the sleeve 30 is made of a ceramic or a metal, the adhesion between the case 10 and the sleeve 30 can be improved, thereby increasing the coefficient of friction between them.

The case 10 and the sleeve 30 formed in this manner are not substantially distorted by a temperature change in a direction perpendicular to the through hole or the axis of the hole while maintaining a high hardness. The case 10 and the sleeve 30 can be machined at a high precision. Since the frictional strength of the sleeve 30 with the mold pattern in the manufacturing process is comparatively poor, the mold pattern can be easily extracted. Thus, a deformation is not substantially caused by a stress in the case 10 and the sleeve 30, so that an axial deviation does not occur.

The liquid crystal polymer constituting the case 10 has a good fluidity during molding, and its respective molecules are aligned in the flowing direction while maintaining their rod-like shape because of their rigid polymer structure. The thermal expansion coefficient of the liquid crystal polymer in the aligning direction is $0.2 \times 10^{-5}/°C$., which is remarkably smaller than that (thermal expansion coefficient of $1.7 \times 10^{-5}/°C$.) of a metal material.

Therefore, if the liquid crystal polymer is used as the resin in molding the case 10 and molded such that its flowing direction coincides with the axial direction of the through hole 10z, the molecules of the liquid crystal polymer are aligned in the axial direction of the through hole 10z, so that their thermal expansion coefficient in the axial direction can be greatly decreased. As a result, even when a temperature change occurs, a change in distance between the end face of the optical fiber and the lens 40 and a distance between the lens 40 and light-emitting and light-receiving elements is decreased, thereby enabling stable data transmission.

Since the liquid crystal polymer is not deflected under 220° C., thus exhibiting a very high heat proof characteristic among resins, a thermo-curing adhesive having a setting temperature of about 160° C. can also be used to fix the lens.

Furthermore, since the liquid crystal polymer has low elasticity, it has excellent relaxation of stress. The fluidity and heat proof characteristic during molding can be improved by adding 20 to 30% of carbon fibers in the liquid crystal polymer.

As the ceramic used to form the sleeve 30, aluminum oxide (alumina), zirconium oxide (zirconia), or the like can be employed.

A zirconia ceramic having a high strength and toughness is particularly preferable. The zirconia ceramic is obtained by forming a material containing $ZrO_2$ as the major component and at least one of $Y_2O_3$, MgO, CaO, $CeO_2$, and the like as the stabilizing agent into a predetermined shape and calcining the resultant material. This is called partially stabilized zirconia ceramic and has a high strength as well as an excellent resistivity of wear out and dimensional repeatability.

As described above, with the resin-molding receptacle and the method of manufacturing the same according to this embodiment, since any deformation does not occur, the coupling loss can be decreased, so that the resin-molding receptacle can serve as a high-precision receptacle. Since the manufacturing method does not include a press-fitting step of the sleeve and the like, the manufacturing time and cost can be reduced, thereby improving the productivity.

A receptacle and a method of manufacturing the same according to the second embodiment will be described.

FIGS. 8A to 8E show a receptacle according to the second embodiment. This receptacle is obtained by adding a pinhole member 60 to the receptacle of the first embodiment. Except for the pinhole member 60, the elements of the second embodiment are identical to those of the first embodiment. Thus, only the pinhole member 60 will be described in detail.

More specifically, the substantially disc-like (annular) pinhole member 60 in which a through hole extending along its axis, is formed is provided in a sleeve 30. The pinhole member 60 has a through hole (pinhole) 60z having an axis coinciding with that of the sleeve 30.

Figure 8A:
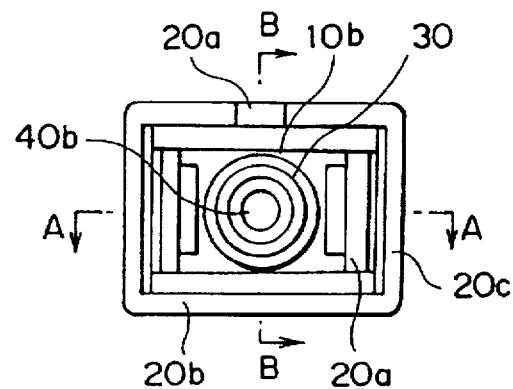
FIG. 8A is a plan view of a resin-molding receptacle according to the second embodiment of the present invention.
Figure 8B:
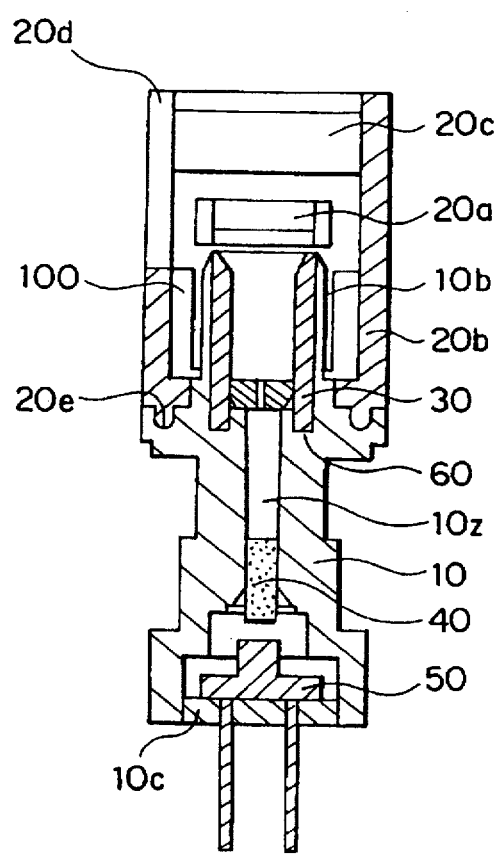
FIG. 8B is a sectional view of the receptacle shown in FIG. 8A along the line B—B.
Figure 8C:
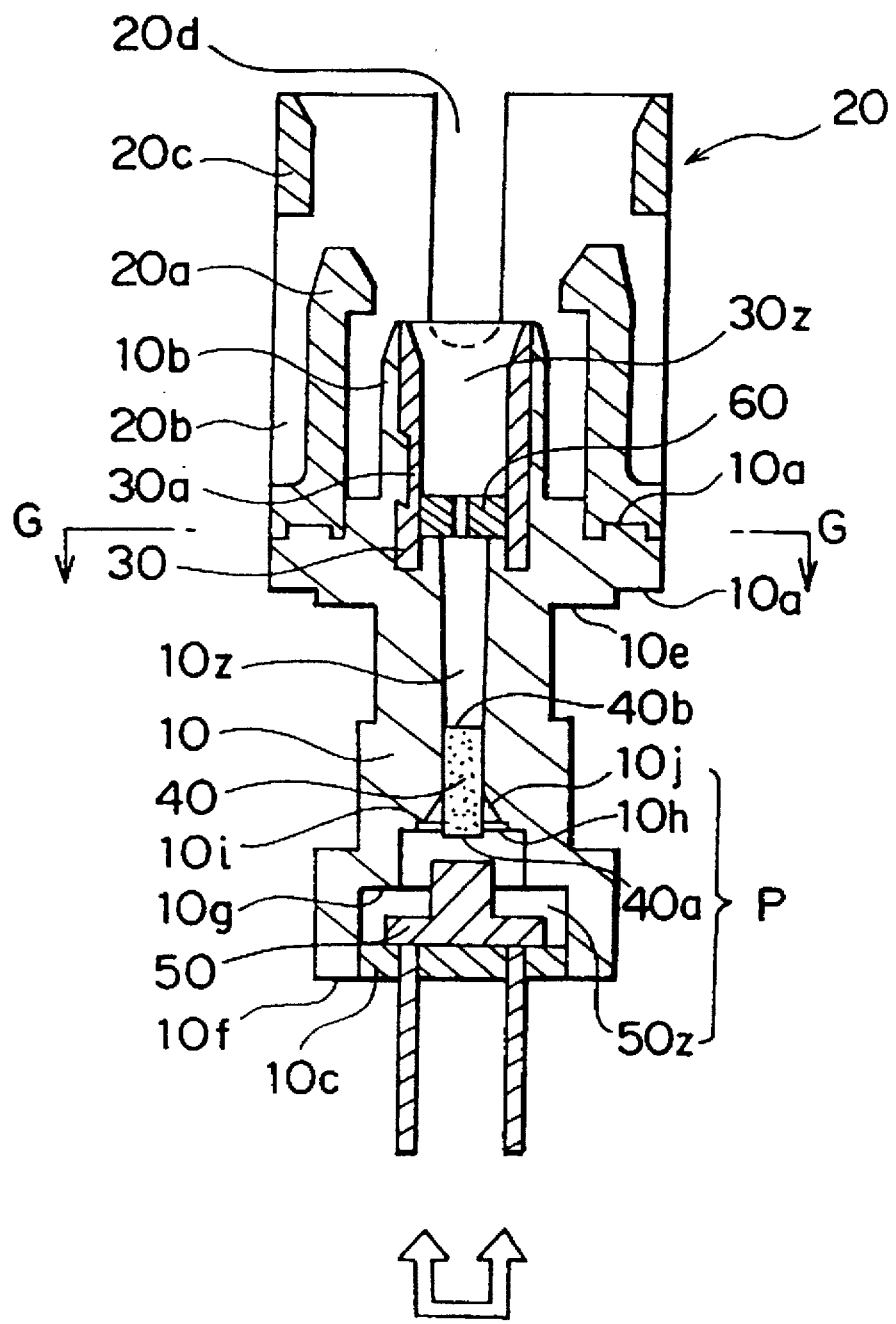
FIG. 8C is a sectional view of the receptacle shown in FIG. 8A along the line A—A.
Figure 8D:
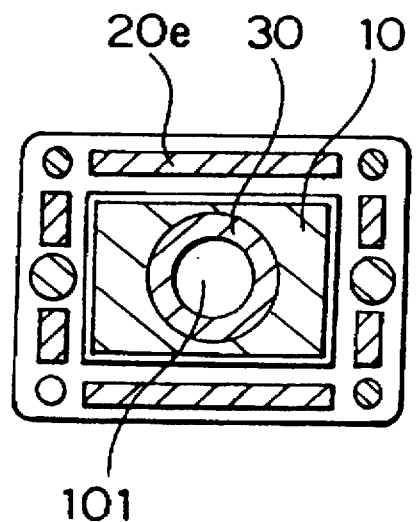
FIG. 8D is a sectional view of the receptacle shown in FIG. 8C along the line G—G.
Figure 8E:
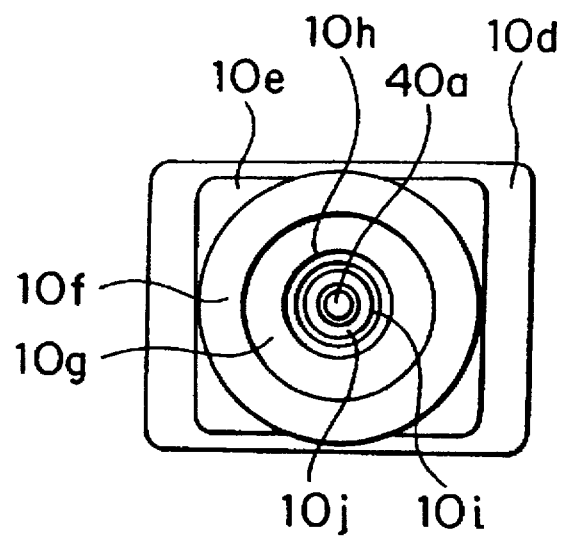
Fig. 8E is a bottom view of the receptacle shown in FIG. 8C seen from a direction of arrow 1 in FIG. 1, from which a base structure in laser diode is not shown.

FIG. 9 is an enlarged sectional view of a portion of the resin-molding receptacle shown in FIG. 8C including the sleeve 30, the through hole 10z, and the pinhole member 60.

The pinhole member 60 has the through hole (hole) 60z having a smaller diameter than that of the through hole 10z on the sleeve 30 side. The axis of the hole 60z coincides with the optical path of light emitted from an optical semiconductor element 50 and the axis of the through hole 10z.

The side wall of the pinhole member 60 is fixed to the inner wall of the sleeve 30 to be in contact with it. The pinhole member 60 has a substantially disc-like shape in which the through hole 60z is formed at the center of the axis. An open end face (opening edge) 10y of the through hole 10z on the sleeve 30 side is rounded to have a curve R so that any burr is not produced.

Thus, the end portion of the side wall of the pinhole member 60 is chamfered to such a degree that it will not contact the curve R defined by the inner wall of the sleeve 30 and the open end face 10y of the through hole 10z on the sleeve 30 side.

In other words, the pinhole member 60 has: first and second surfaces 1060a, 1060b opposing each other, the pinhole 60z extending between the first surface 1060a and the second surface 1060b along the axis OA1 of the rigid sleeve 30, a side surface 1060c surrounding the pinhole member 60 and being continued to the first and second surfaces 1060a, 1060b, wherein the side surface 1060c is fixed to the inner surface 1030i of the rigid sleeve 30, wherein the first surface 1060a faces the light source 50 via the through hole 10z of the case 10, and wherein a transfer surface 1060d connects the first surface 1060a to the side surface 1060b, the transfer surface 1060d forming obtuse angles with the side and first surfaces 1060c, 1060a, wherein the opening edge 10y of the through hole 10z at the end of the case 10 nearer to the rigid sleeve 30 is in contact with the first surface 1060a of the pinhole member 60.

Thus, the open end face 10y of the through hole 10z on the sleeve 30 side and the pinhole member 60 are in contact with each other such that the axis of the through hole 60z coincides with the axis of the through hole 10z at a high precision. When the pinhole member 60 is fixed in the sleeve 30, if a ferrule (optical connector) is inserted in the sleeve 30, the shift of the ferrule in the axial direction of the sleeve 30 is suppressed. The pinhole member 60 can be mounted by using an adhesive. Alternatively, a projection or the like may be provided, and the pinhole member 60 may be mounted in the sleeve 30 by press fit or the like.

A recessed portion may be formed in the pinhole member 60, and the pinhole member 60 may be mounted in the sleeve 30 by ultrasonic compression. More specifically, when the distal end of an ultrasonic inserter is abutted against the pinhole member 60 to press-fit the pinhole member 60, an ultrasonic wave is transmitted to the recessed portion of the pinhole member 60, and the projecting portion of the pinhole member 60 is press-fit by the operation of the ultrasonic wave while melting the inner surface of the through hole 10z, thereby fixing the pinhole member 60 in the sleeve 30.

As a result, since the pinhole member 60 is press-fit while fusing the inner surface of the through hole 10z, an internal strain does not easily occur. Since the distal end of the ultrasonic inserter can be drive-controlled in units of 2 μm, the positioning precision of the pinhole member 60 can be set very high.

If a groove or the like is formed in the recessed portion of the pinhole member 60, the curing temperature can be further increased.

The principle of this axial shift suppression and the result of experiment will be described with reference to FIGS. 10A, 10B, and 10C, and FIG. 11.

Figure 10A:
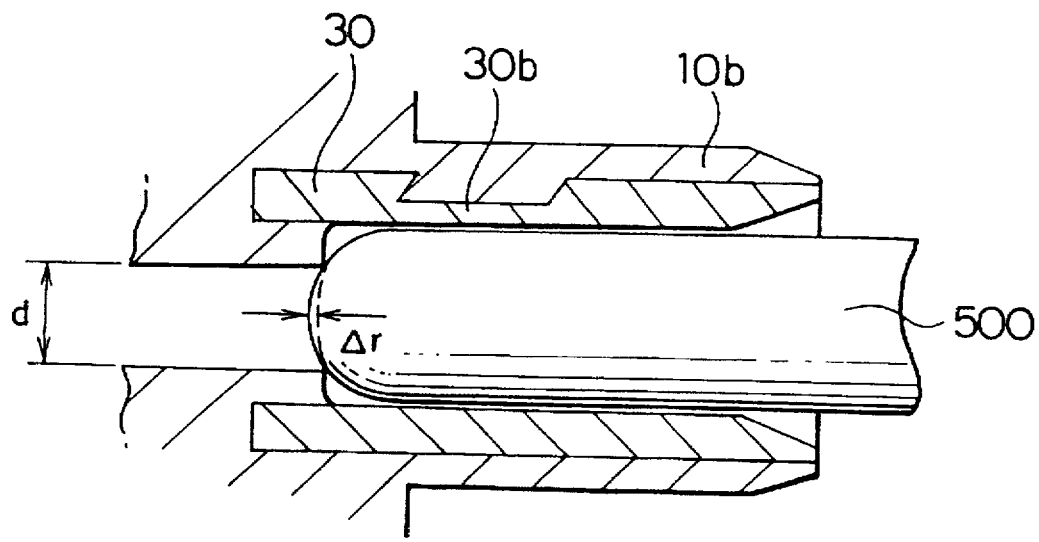
FIG. 10A is a sectional view for explaining the length deviation (z-axis direction) of a ferrule in light propagating direction, when the ferrule is inserted in the sleeve 30 shown in FIGS. 8A to 8E.
Figure 10B:
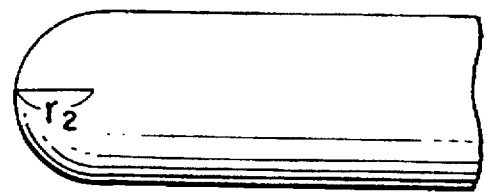
FIGS. 10B and 10C are views for explaining ferrules whose distal end portions have different curves.
Figure 10C:
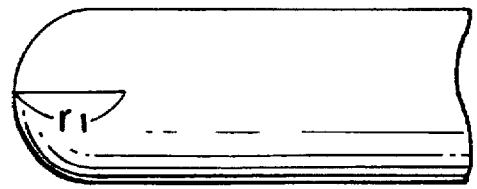
Figure 12A:
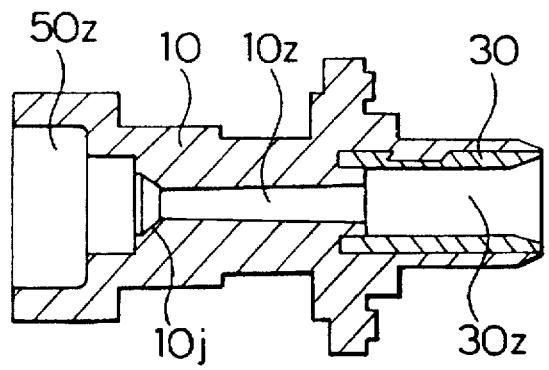

FIGS. 10A to 10C are views for explaining an axial shift occurring when a ferrule 500a, in which a fiber (consisting of a cladding layer 500b and a core 500c) is buried, is inserted in the sleeve 30, as shown in FIG. 12F.

The ferrule 500a in which the fiber is buried has roundness having a radius of 10 to 25 mm (17.5 mm ±7.5 mm) (see FIGS. 10B and 10C). Assuming that the radii of the roundness are defined as $r_1$ and $r_2$ ($r_1 > r_2$) and that the radius of the open end of the through hole 10z in the sleeve 30 is defined as d, a difference in radius of the roundness Δr of the ferrule 500a in the axial direction (z-axis direction) of the sleeve 30 is given by:

$$\Delta r = (r_1 - r_2) + [\sqrt{(r_1^2 - d^2/4)} - \sqrt{(r_2^2 - d^2/4)}] \quad (1)$$

Figure 11:
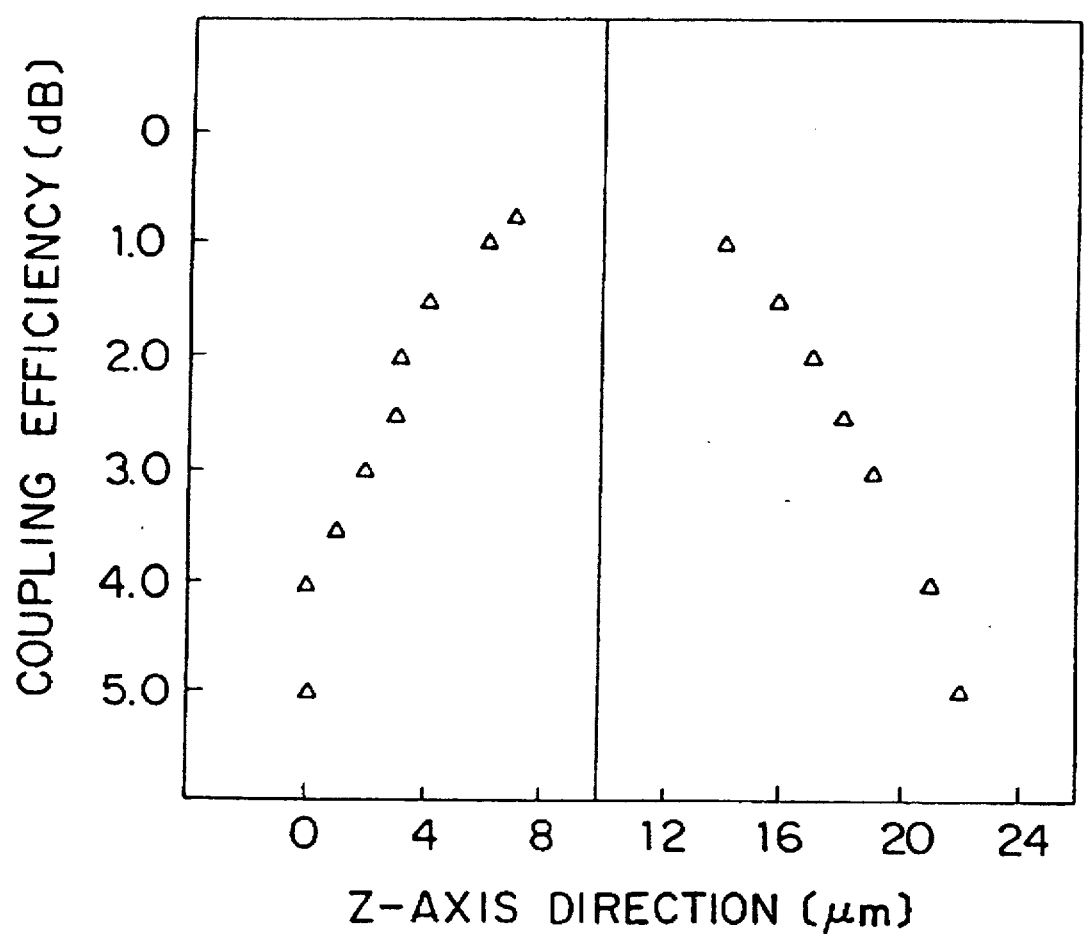
FIG. 11 is a graph showing the dependency of the coupling efficiency (dB) due to the deviation of the ferrule position (μm) in the Z-axis direction.

For example, when d=1.4 mm, $r_1$=25 mm, and $r_2$=10 mm, the error Δr=14.7 μm. In this single-mode fiber, the difference Δr=±8 μm is caused in the z-axis direction, as shown in FIG. 10A. When this difference in the z-axis direction occurs, a loss of about 3 to 4 dB occurs in transmission of light, as shown in FIG. 11. This loss of about 3 to 4 dB cannot be allowed in the single-mode fiber. Note that the reference point of FIG. 11 in the z-axis direction is set at the open end face 10y of the through hole 10z on the sleeve 30 side.

In the resin-molding receptacle according to this embodiment, the pinhole member 60 is used. The difference in the z-axis reduced is decreased in accordance with equation (1) due to the presence of the small radius through hole 60z of the pinhole member 60 with which the ferrule is in contact. For example, when the diameter of the through hole 60z is 0.6 mm, the variation value is Δr=3 μm. Accordingly, when considering variations (17.5 ±7.5 mm) in radius of curvature, the resultant loss is about 0.5 dB, which is within a sufficiently allowable range in optical fiber transmission.

A method of manufacturing the resin-molding receptacle shown in FIG. 8C will be described.

A resin-molding receptacle whose sleeve 30 is held by a case 10 with its outer circumferential surface (outer wall) is manufactured (see FIG. 12A), in the same manner as in the method of the first embodiment, by employing the steps described with reference to FIGS. 3 to 5.

Figure 12B:
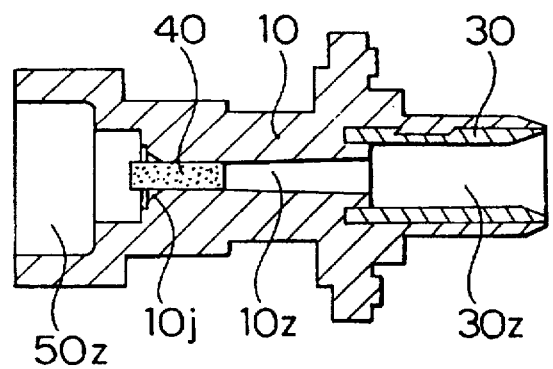

Then, a frustoconical SELFOC lens 40 is placed in the through hole 10z of the case 10. After the SELFOC lens 40 is fitted in the through hole 10z, an adhesive is coated on an inverted conical portion 10j molding by a frustoconical surface 320j of a mold pattern 320, thereby adhering/fixing the SELFOC lens 40 (see FIG. 12B).

Figure 12C:
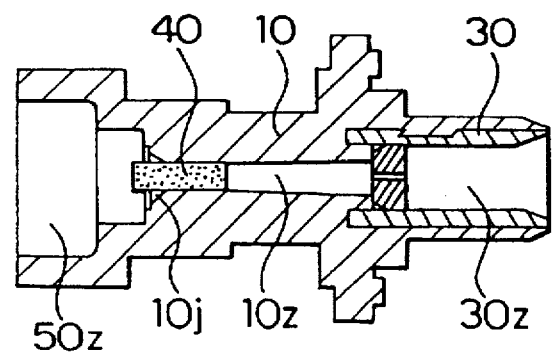

The pinhole member 60 is fitted and fixed in the sleeve 30 such that the axis of its through hole 60z coincides with the axis of the sleeve 30 (FIG. 12C).

Figure 12D:
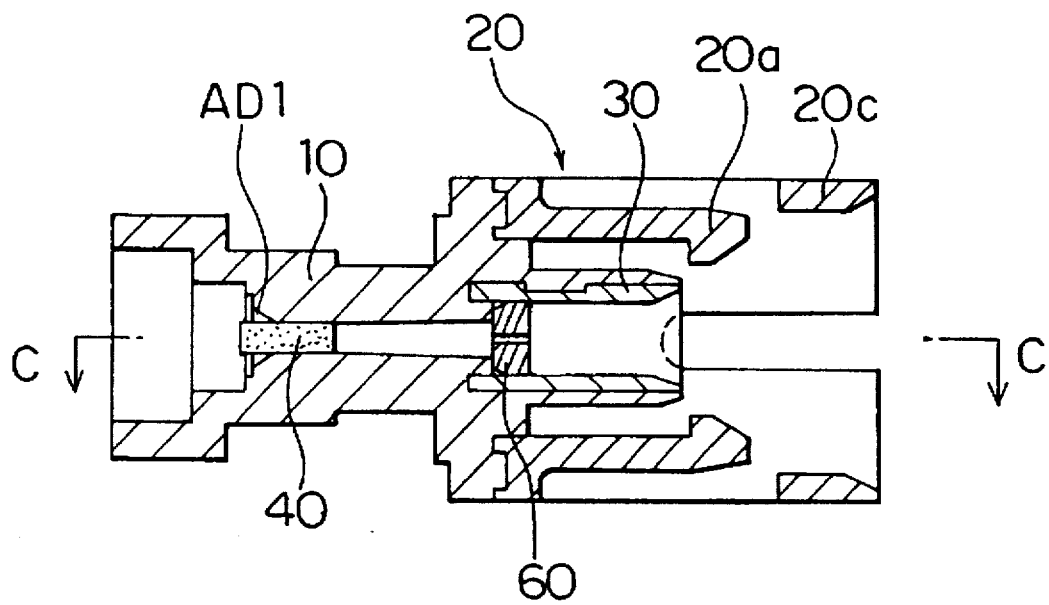
Figure 13:
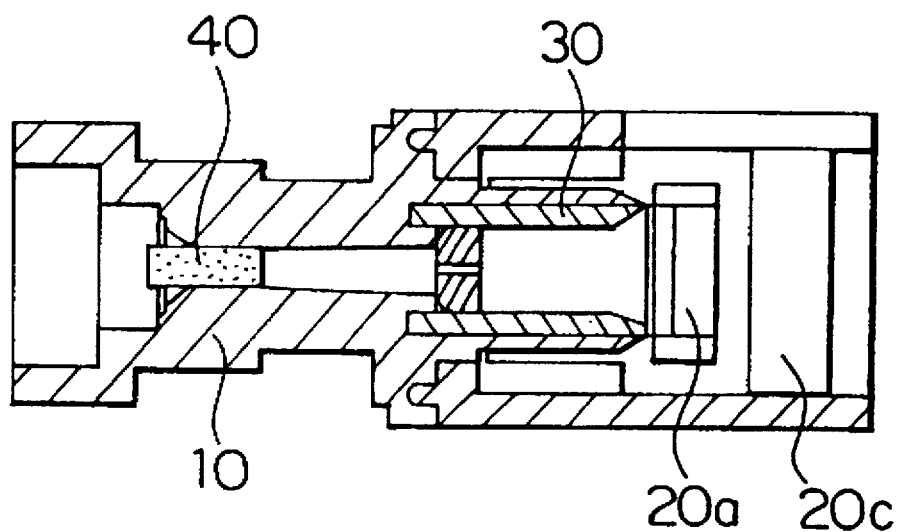
FIG. 13 is a sectional view of the intermediate product shown in FIG. 12D along the line C—C.

Subsequently, an SC connector holding section 20 made of a resin material is mounted to the case 10 by molding or ultrasonic compression (see FIG. 12D). At this time, since the proximal end portion of the SC connector holding section 20 is fitted with a recessed portion 20e and a projecting portion 10a shown in FIGS. 8B and 8C, the SC connector holding section 20 will not be shifted in a direction perpendicular to the axial direction of the sleeve 30. FIG. 13 is a sectional view taken along the line C—C of FIG. 12D.

Figure 12E:
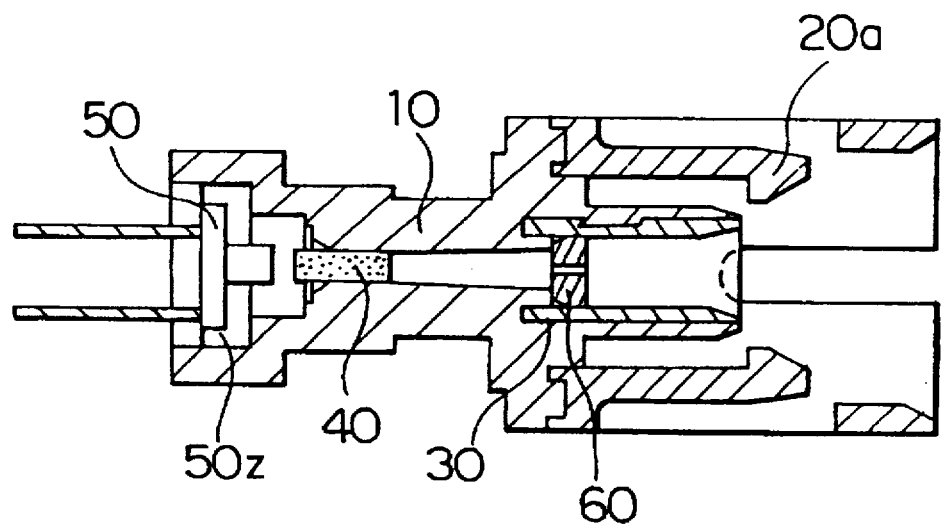

The optical semiconductor element 50 is inserted in a mounting hole 50z and fixed in the case 10 (see FIG. 12E). In this fixing, an ultraviolet (UV)-curing agent is coated between the optical semiconductor element 50 and the mounting hole 50z, and ultraviolet rays are irradiated on the agent, thereby fixing the optical semiconductor element 50 in the mounting hole 50z.

Thereafter, part of each lead pin 150e of the optical semiconductor element 50 is exposed to the outside of the case 10, as shown in FIG. 12F, and a lid portion 10c is fixed to the case 10 with an epoxy resin, thereby obtaining the resin-molding receptacle shown in FIG. 8C. This resin-molding receptacle is connected to a (SC) connector 500. The SC connector 500 is constituted by an SC connector support portion 500d, a ferrule holding portion 500e, a ferrule 500a, a spring 500f, and a fiber (consisting of a cladding layer 500b and a core 500c). The ferrule 500a is fixed by the ferrule holding portion 500e. The spring 500f is interposed between the ferrule holding portion 500e and the SC connector support portion 500d and biases the SC connector support portion 500d. The fiber is enclosed by the ferrule 500a. The outer wall of the SC connector support portion 500d is in contact with the inner wall of the ferrule holding portion 500e. The ferrule holding portion 500e is slidably moved by the coiled spring 500f surrounding the ferrule 500a.

The distal end portion of the SC connector support portion 500d is fitted between pawl portions 20a as the SC connector 500 is inserted in the resin-molding receptacle, and the ferrule 500a is fitted in the sleeve 30 such that its outer wall is in contact with the inner wall of the sleeve 30. Since the projecting portions 20a are further provided to the case 10, the ferrule 500a will not be undesirably removed from the case 10.

As described above, with the manufacturing method of a resin-molding receptacle according to the second embodiment, the axis of the through hole in the resin and the axis of the sleeve can be automatically aligned without causing any axial deformation. In this resin-molding receptacle, since the through hole 10z constituting the case 10 and the sleeve 30 are integrally formed in this manner, not only other deformation does not occur, but also a supersonic compression step of the sleeve or the like is not included. Thus, a strain caused by press fit can be avoided.

As described above, with the resin-molding receptacle and the method of manufacturing the same according to the second embodiment, since any other deformation does not occur, the transmission loss can be decreased, so that the resin-molding receptacle can serve as a high-precision receptacle. Since the manufacturing method does not include a press-fitting step of the sleeve and the like, the manufacturing time and cost can be reduced, thereby improving productivity.

Since a deviation of focal length by the differences of radius in ferrule inserted into the sleeve can be suppressed by the pinhole member, the transmission loss of the optical fiber can be reduced.

When the mold pattern employed in the present invention is used, a resin-molding receptacle can be manufactured, in which the optical path of light emitted from the optical semiconductor element and the optical axis of the fiber can be set to coincide with each other and which has a reference surface that can eliminate adjustment of the Φ and θ components of the optical semiconductor element.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 149827/1994 filed on Jun. 30, 1994, No. 149835/1994 filed on Jun. 30, 1994 and No. 149844/1994 filed on Jun. 30, 1994 are hereby incorporated by reference.

What is claimed is:

1. A receptacle for coupling light from a light source to an optical fiber installed in a ferrule, comprising:

(a) a rigid sleeve having a through hole defined by the inner radius, wherein the ferrule fits into the inner hole by inserting the ferrule into it;

(b) a case made of resin, holding said rigid sleeve by being in contact with the outer wall of said rigid sleeve, having a through hole communicating with the through hole of said rigid sleeve at one end thereof; and (c) a lens fixed to the inner wall of the through hole of said case, the optical axis of said lens being identical with the axis of the through hole of said case, the axis of the through hole of said rigid sleeve being identical with the axis of the through hole of case, the light being coupled to the optical fiber through said lens, sleeve and ferrule;

further comprising a pinhole member having: first and second surfaces opposing each other, a pinhole extending between said first surface and said second surface along the axis of said rigid sleeve, a side surface surrounding said pinhole member and being continued to said first and second surfaces, wherein said side surface is fixed to the inner wall of said rigid sleeve, wherein said first surface faces the light source via the through hole of said case, and wherein a transfer surface connects said first surface to said side surface, said transfer surface forming obtuse angles with said side and first surfaces, wherein an opening edge of the through hole at the end of said case nearer to said rigid sleeve is in contact with said first surface of said pinhole member.

2. A receptacle for coupling light from a light source to a fiber, comprising:

(a) a rigid sleeve;

(b) a one piece case made of resin, having first and second through holes, an outer surface of said rigid sleeve being in contact with an inner surface of said first through hole;

(c) a lens fixed to an inner surface of said second through hole of said case, said lens having an optical axis identical with an axis of said first through hole; and (d) a pinhole member having:

first and second surfaces opposing each other, a pinhole extending between said first surface and said second surface and aligned along an axis of said rigid sleeve, a side surface surrounding said pinhole member and being continued to said first and second surfaces, wherein said side surface is fixed to the inner surface of said rigid sleeve, wherein said first surface faces the light source via said second through hole of said case, wherein a transfer surface connects said first surface to said side surface, said transfer surface forming obtuse angles with said side surface, and wherein an opening edge of said second through hold of said case nearer to said rigid sleeve is in contact with said first surface of said pinhole member.

3. A receptacle, comprising:
   (a) a rigid sleeve;
   (b) a one piece case made of resin, having first and second through holes in communication with each other, an outer surface of said rigid sleeve being in contact with an inner surface of said first through hole;
   (c) a light source fixed in said case;
   (d) a lens fixed to an inner surface of said second through hole of said case, and arranged between said light source and said sleeve, said lens having an optical axis identical with an axis of said first through hole.

4. A receptacle according to claim 3, wherein said outer surface of said sleeve is rough.

5. A receptacle according to claim 4, wherein a portion of said outer surface of said sleeve has a concave region.

6. A receptacle according to claim 3, wherein the resin is made of liquid crystal polymer, and polymer molecules of said resin are aligned with the axis of said first through hole.

7. A receptacle according to claim 3, wherein said sleeve is comprised of metal.

8. A receptacle according to claim 3, wherein said sleeve is comprised of ceramic.

9. A receptacle according to claim 3, further comprising a pair of clips that extend from said case and that for grasping an outer wall of a housing that contains a ferrule therein when the ferrule is inserted into said sleeve.

10. A receptacle according to claim 3, further comprising a pin hole member having a pinhole extending along the axis of said sleeve, wherein an end of a ferrule when inserted into said sleeve abuts on an opening edge defined by said pinhole.

* * * * *